(12) United States Patent
Morimoto et al.

(10) Patent No.: US 12,348,034 B2
(45) Date of Patent: Jul. 1, 2025

(54) POWER SYSTEM STABILIZING SYSTEM

(71) Applicants: Kabushiki Kaisha Toshiba, Tokyo (JP); Toshiba Energy Systems & Solutions Corporation, Kawasaki (JP)

(72) Inventors: Yukina Morimoto, Tokyo (JP); Akira Ishibashi, Tokyo (JP); Hiroshi Iwaki, Tokyo (JP)

(73) Assignees: Kabushiki Kaisha Toshiba, Tokyo (JP); Toshiba Energy Systems & Solutions Corporation, Kawasaki (JP)

(*) Notice: Subject to any disclaimer, the term of this patent is extended or adjusted under 35 U.S.C. 154(b) by 234 days.

(21) Appl. No.: 18/149,424

(22) Filed: Jan. 3, 2023

(65) Prior Publication Data

US 2023/0155379 A1    May 18, 2023

Related U.S. Application Data

(63) Continuation of application No. PCT/JP2021/029336, filed on Aug. 6, 2021.

(30) Foreign Application Priority Data

Aug. 26, 2020  (JP) ................... 2020-142998

(51) Int. Cl.
  *H02J 3/38*  (2006.01)
  *H02J 3/00*  (2006.01)

(52) U.S. Cl.
  CPC ........ *H02J 3/0012* (2020.01); *H02J 3/00125* (2020.01); *H02J 3/007* (2020.01);
  (Continued)

(58) Field of Classification Search
  CPC .... H02J 3/00; H02J 3/38; H02J 3/0012; H02J 3/00125; H02J 3/007; H02J 3/381;
  (Continued)

(56) References Cited

U.S. PATENT DOCUMENTS

2013/0285670 A1* 10/2013 Yoshidomi ............. G01R 31/52
                                                                 324/510
2013/0307343 A1* 11/2013 Behrends .................. H02J 1/10
                                                                 307/85

FOREIGN PATENT DOCUMENTS

| JP | 2001-339862 A | 12/2001 |
| JP | 2012-170167 A | 9/2012 |
| JP | 2017-60355 A | 3/2017 |

OTHER PUBLICATIONS

Daisuke Nakamura et al., "Transfer Trip System Developed for Relaxing Limitation of Power Supply Output from Renewable Energy," IEE Japan Papers of Tech. Meeting on "Power Protective Relaying," PPR-19-024, 5 pages, and translation, 7 pages (Nov. 22, 2019).

* cited by examiner

*Primary Examiner* — Danny Nguyen
(74) *Attorney, Agent, or Firm* — Finnegan, Henderson, Farabow, Garrett & Dunner, LLP

(57) ABSTRACT

A power system stabilizing system includes an accident detector, a power restriction target selector, a cutoff controller, and a reconnection controller. The accident detector is configured to detect a system accident of a power system. The power restriction target selector is configured to select power restriction targets which are required for stability maintenance of the power system out of a plurality of power supplies included in the power system or connected to the power system according to a type of the system accident detected by the accident detector. The cutoff controller is configured to cut off the power restriction targets selected by the power restriction target selector. A system restoration checker is configured to check that the power system has been restored from the system accident on the basis of system information of the power system. The reconnection (Continued)

controller is configured to reconnect some or all of the power restriction targets cut off by the cutoff controller when the system restoration checker checks that the power system has been restored from the system accident.

10 Claims, 16 Drawing Sheets

(52) U.S. Cl.
CPC ............... *H02J 3/38* (2013.01); *H02J 3/381* (2013.01); *H02J 3/388* (2020.01); *H02J 2300/22* (2020.01)

(58) Field of Classification Search
CPC ........ H02J 3/338; H02J 2300/22; H02J 13/00; H02J 3/24
USPC ..................................................... 361/42–50
See application file for complete search history.

| POSTULATED ACCIDENT TYPE NUMBER | POWER RESTRICTION TARGET |
|---|---|
| 1 | 50-1, 50-2, 50-3 |
| 2 | 50-2, 50-3 |
| 3 | 50-1 |
| ⋮ | ⋮ |

SSC2

SSC3

SSC

POWER SYSTEM STABILIZING SYSTEM

CROSS-REFERENCE TO RELATED APPLICATION

This application is based upon and claims the benefit of priority from Japanese Patent Application No. 2020-142998, filed Aug. 26, 2020 and PCT/JP2021/029336, filed Aug. 6, 2021; the entire contents all of which are incorporated herein by reference.

FIELD

An embodiment of the present invention relates to a power system stabilizing system.

BACKGROUND

Recently, introduction of regeneration energy has progressed. Since most regeneration energy is generated by variable power supplies of which an output varies depending on weather conditions such as solar power generation or wind power generation, there is concern about an influence on the stability of a power system. Accordingly, demand for a power system stabilizing system including a regeneration energy power supply (hereinafter referred to as a "regenerative power supply") as a control target is expected to increase.

In general, a power system stabilizing system prevents occurrence of an abnormal phenomenon such as a step-out phenomenon (a transient stability abnormality), a frequency abnormality, a voltage abnormality, or an overload of a power system or prevents an increasing extension of such an abnormal phenomenon to the whole system.

FIG. 17 is a diagram showing a configuration of a power system stabilizing system SSC including a regenerative power supply as a control target according to the related art. The power system stabilizing system SSC includes, for example, an accident detector 1, an arithmetic processor 2, and a controller 3.

The accident detector 1 detects occurrence of a system accident in a power system.

When a system accident is detected by the accident detector 1, the arithmetic processor 2 determines a regenerative power supply which is to be disconnected from the power system on the basis of a type of the system accident. "Disconnection" is disconnection from a power system and may be referred to below as "cutoff," "power restriction," or "dropping." Control for forcibly cutting off some power supplies from a power system to prevent extension of an influence of an accident to the whole power system is referred to as power supply restriction or power restriction. In the following description, a control target such as a regenerative power supply which is selected as a target of power supply restriction is referred to as a power restriction target.

The controller 3 cuts off a power restriction target on the basis of a power restriction command from the arithmetic processor 2. In the power system stabilizing system SSC for a system including regenerative power supplies, when the number of regenerative power supplies which are control targets is too large, the controller 3 is generally divisionally configured as a distribution device 3a and a reception device 3b. For example, a configuration in which one distribution device 3a and multiple reception devices 3b are provided is employed, and a transmission hardware volume of the arithmetic processor 2 is curbed by causing the distribution device 3a to receive a control command output from the arithmetic processor 2 and causing the distribution device 3a to transmit the control command to the reception devices 3b.

A regenerative power supply which has been cut off by the power system stabilizing system SSC at the time of occurrence of a system accident may be reconnected when reclosing of a place in which the system accident has occurred succeeds and the system is restored to a system state before the system accident occurred.

However, the power system stabilizing system SSC performs control for cutting off a power restriction target at the time of occurrence of a system accident, but does not perform a check of restoration from the system accident and reconnection of a regenerative power supply after the power system has been restored from the system accident. Accordingly, a check of restoration from a system accident and reconnection of a regenerative power supply are generally carried out by a human system such as an operator. For example, an operator goes to the site and carries out an operation of checking that the power system has been restored from the system accident and then reconnecting a regenerative power supply which has been cut off. Accordingly, time is required for from a check of restoration from an accident to reconnection, and thus a time in which a regenerative power supply is disconnected from the power system and an output thereof is stopped (hereinafter referred to as a "stop time") may be elongated. This problem with the stop time is not limited to a case in which a regenerative power supply cut off by the power system stabilizing system SSC is reconnected, but is common even when a regenerative power supply is disconnected due to an influence of a system accident, an isolated operation preventing function of a power conditioner, or the like. As a result, there is concern about deterioration in system stability, and there is a likelihood of warranty costs of a power company for power generation business operators increasing or a likelihood of restriction of emergency control.

An objective of the present invention is to provide a power system stabilizing system that can shorten a stop time of a power supply.

A power system stabilizing system according to an embodiment includes an accident detector, a power restriction target selector, a cutoff controller, and a reconnection controller. The accident detector is configured to detect a system accident of a power system. The power restriction target selector is configured to select power restriction targets which are required for stability maintenance of the power system out of a plurality of power supplies included in the power system or connected to the power system according to a type of the system accident detected by the accident detector. The cutoff controller is configured to cut off the power restriction targets selected by the power restriction target selector. A system restoration checker is configured to check that the power system has been restored from the system accident on the basis of system information of the power system. The reconnection controller is configured to reconnect some or all of the power restriction targets cut off by the cutoff controller when the system restoration checker checks that the power system has been restored from the system accident.

DETAILED DESCRIPTION

A power system stabilizing system according to an embodiment includes an accident detector, a power restriction target selector, a cutoff controller, and a reconnection controller. The accident detector is configured to detect a system accident of a power system. The power restriction target selector is configured to select power restriction targets which are required for stability maintenance of the power system out of a plurality of power supplies included in the power system or connected to the power system according to a type of the system accident detected by the accident detector. The cutoff controller is configured to cut off the power restriction targets selected by the power restriction target selector. A system restoration checker is configured to check that the power system has been restored from the system accident on the basis of system information of the power system. The reconnection controller is configured to reconnect some or all of the power restriction targets cut off by the cutoff controller when the system restoration checker checks that the power system has been restored from the system accident. According to the embodiment, it is possible to provide a power system stabilizing system that can shorten a stop time of a power supply.

Hereinafter, a power system stabilizing system according to an embodiment will be described with reference to the accompanying drawings.

First Embodiment

Figure 1:
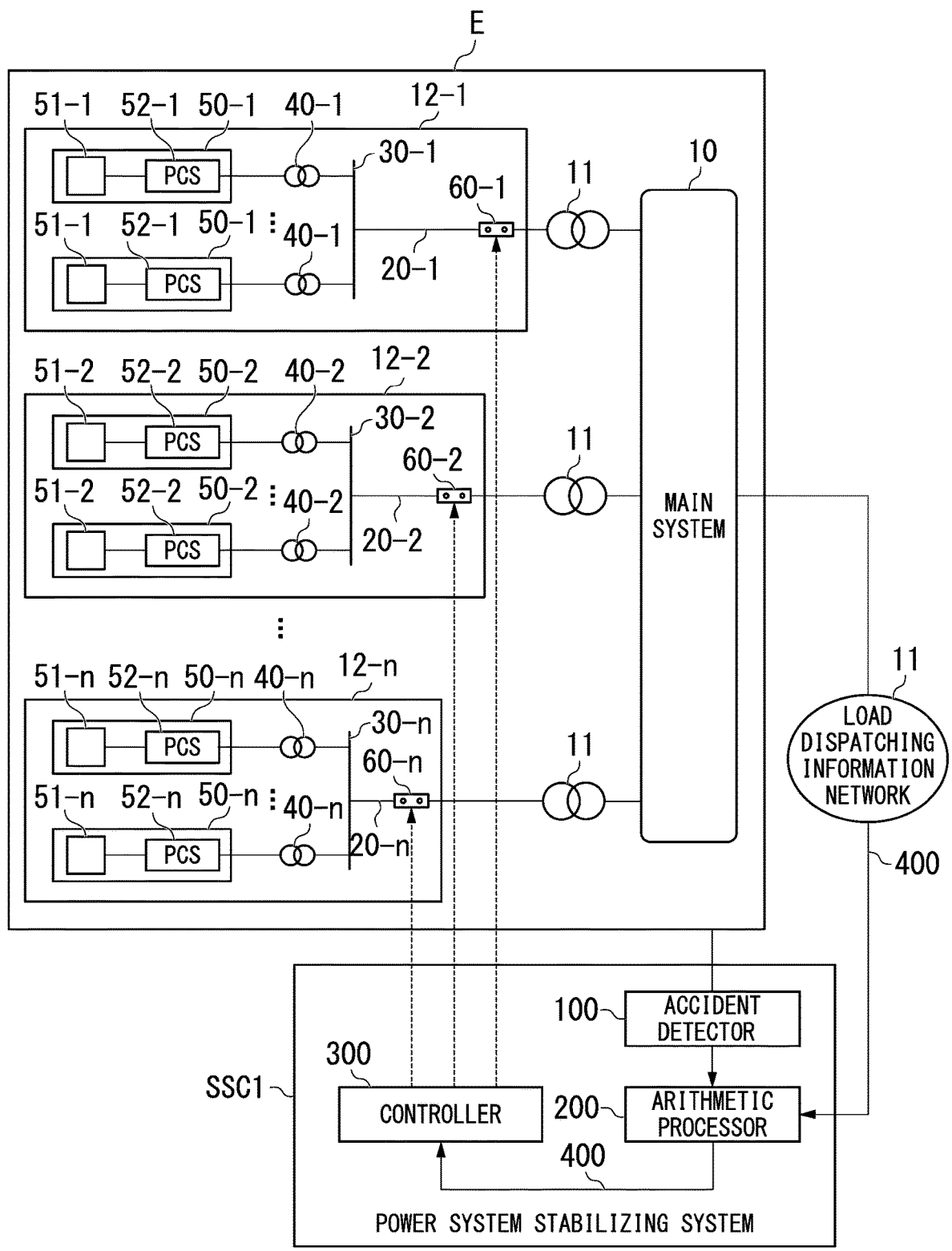
FIG. 1 is a diagram showing a configuration of a power system E to which a power system stabilizing system SSC1 according to a first embodiment is applied.

FIG. 1 is a diagram showing a configuration of a power system E to which a power system stabilizing system SSC1 according to a first embodiment is applied. The power system E includes various types of equipment such as power supplies including regenerative power supplies, power lines, and transformers. The power system E may include a synchronous power generator in addition to regenerative power supplies as long as it includes regenerative power supplies. For example, the power system E includes a main system 10, a power distributing substation 11, and a plurality of external systems 12-$k$ ($k$=1, 2, . . . , n, where n is an integer equal to or greater than 2). In the following description, signs added after hyphens, which indicate external systems to which elements belong, may be omitted.

The power distributing substation 11 supplies electric power from the main system 10 which is a system more significant than the power distributing substation 11 to the external systems 12 which is a system less significant than the power distributing substation 11.

Each external system 12-$k$ includes, for example, a power supply line 20-$k$, a bus line 30-$k$, one or more transformers 40-$k$, and one or more regenerative power supplies 50-$k$.

The power supply line 20-$k$ is a connection line for connecting the power distributing substation 11 and the bus line 30-$k$.

One or more regenerative power supplies 50-$k$ are connected to the bus line 30-$k$ via one or more transformers 40-$k$. Loads such as electrical appliances of a consumer may be connected to the bus line 30-$k$ via the transformer 40-$k$. In the example shown in FIG. 1, a plurality of regenerative power supplies 50-$k$ are electrically connected to the bus line 30-$k$, but the invention is not limited thereto and the number of regenerative power supplies 50-$k$ connected to the bus line 30-$k$ may be one.

Each regenerative power supply 50-$k$ is an asynchronous power generator using regeneration energy. The regenerative power supplies 50-$k$ are, for example, distributed power supplies which are small-scale power generation equipment distributed in the vicinity of power consumers or the like. Each regenerative power supply 50-$k$ includes, for example, a power generation device 51-$k$ such as a solar cell and a power conditioner system (PCS) 52-$k$.

The PCS 52-$k$ includes an inverter that converts DC electric power output from the power generation device 51-$k$ to AC electric power. The PCS 52-$k$ has, for example, an isolation operation preventing function of detecting isolated operation on the basis of a change in frequency or voltage of the main system 10 side and disconnecting the regenerative power supply 50-$k$ from the main system 10.

A breaker 60-$k$ is provided in the power supply line 20-$k$. When the breaker 60-$k$ is switched from an electrified state (an on state) to an unelectrified state (an off state), the regenerative power supplies 50-$k$ are cut off (disconnected) from the main system 10. When the breaker 60-$k$ is switched from the unelectrified state to the electrified state, the regenerative power supplies 50-$k$ are connected to the main system 10. When a regenerative power supply 50-$k$ is disconnected and then is connected again to the main system 10, this is called reconnection.

The power system stabilizing system SSC1 is, for example, an online pre-calculation type power system stabilizing system. The power system stabilizing system SSC1 performs transient stability calculation for each preset postulated accident using system information acquired online from the power system E, determines control details for each postulated accident, and sets a control table on the basis of the result of determination. When a system accident actually occurs, the power system stabilizing system SSC1 performs control by comparing an accident type of the system accident with the control table. The system information includes, for example, information on a connection state, a power demand-supply state, and a power flow state of the power system E. The connection state of the power system E includes, for example, connection information of breakers or disconnectors included in the main system 10 and the external systems 12-$k$. The power demand-supply state includes, for example, information on outputs or loads of the regenerative power supplies 50-$k$ of the main system 10 and the external system 12-$k$, active power and reactive power of power lines or transformers included in the main system 10 and the external systems 12-$k$, a voltage level or a current level in the power system E, and phases of the power system E (for example, a phase of a voltage).

The control details are power supplies which are disconnected when a system accident occurs. The control details may include turbine early valve actuation (EVA) for curbing acceleration of a power supply in addition to power supply restriction. The configuration of the power system stabilizing system SSC1 will be described below.

Figure 2:
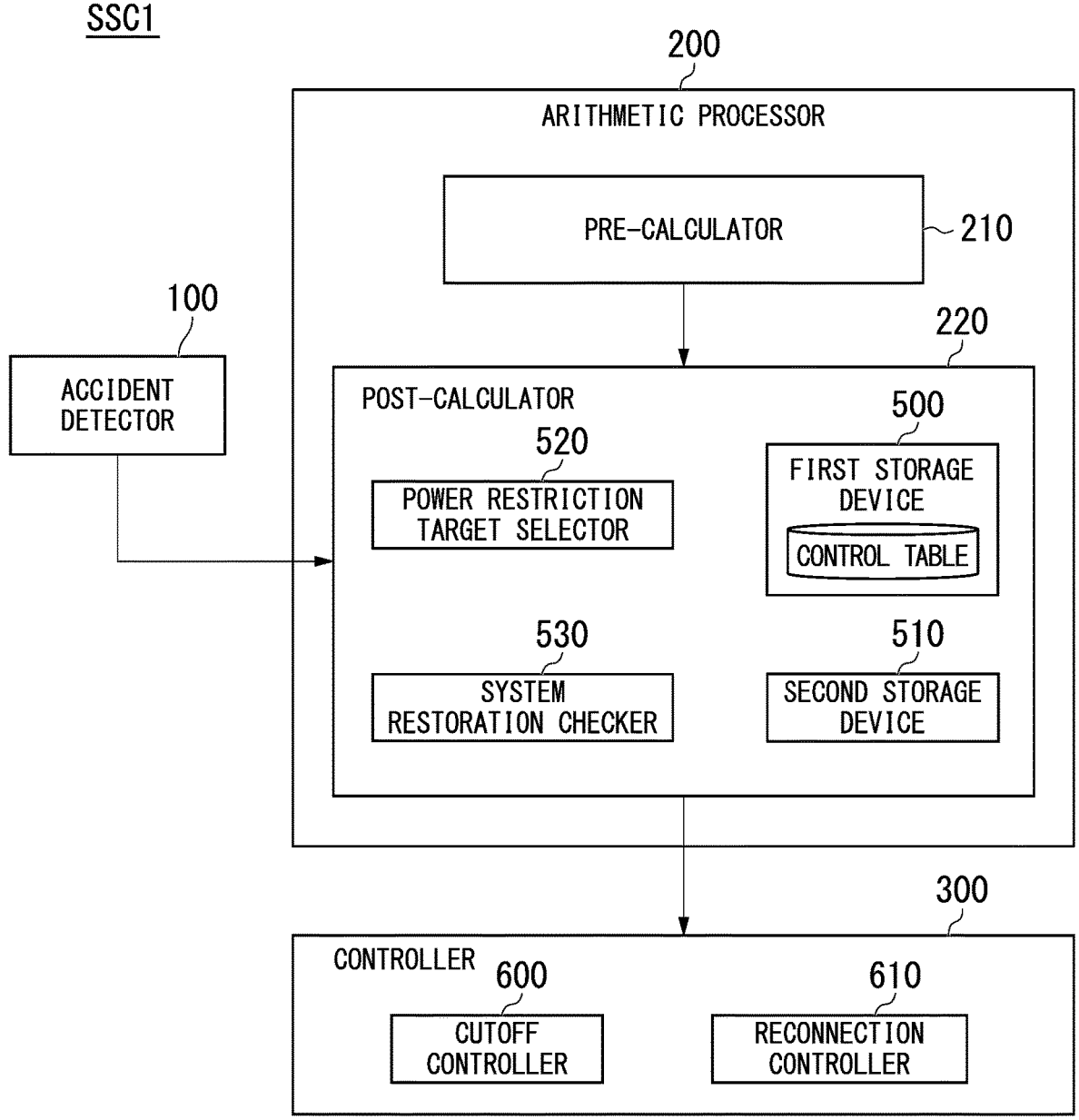
FIG. 2 is a diagram showing a configuration of the power system stabilizing system SSC1 according to the first embodiment.

FIG. 2 is a diagram showing the configuration of the power system stabilizing system SSC1. The power system stabilizing system SSC1 includes, for example, an accident detector 100, an arithmetic processor 200, and a controller 300. These constituents are implemented, for example, by causing a hardware processor such as a central processing unit (CPU) to execute a program (software). Some or all of these constituents may be implemented by hardware (a circuit unit including circuitry) such as a large scale integration (LSI) chip, an application-specific integrated circuit (ASIC), a field-programmable gate array (FPGA), or a graphics processing unit (GPU), or may be implemented by a combination of software and hardware. The program may be stored in a storage device (a storage device including a non-transitory storage medium) such as a hard disk drive (HDD) or a flash memory in advance or may be stored in a detachable storage medium (a non-transitory storage medium) such as a DVD or a CD-ROM and may be installed in the storage device by setting the storage medium to a drive device. The storage device is implemented, for example, by an HDD, a flash memory, an electrically erasable programmable read only memory (EEPROM), a read only memory (ROM), or a random access memory (RAM).

The accident detector 100, the arithmetic processor 200, and the controller 300 which are constituents of the power system stabilizing system SSC1 are connected by communication equipment 400 (for example, a signal line or a communication device).

The accident detector 100 is installed, for example, in a substation. The accident detector 100 acquires system information from the power system E, detects occurrence of a system accident in the power system E, and additionally determines a type of a system accident that is detected. When occurrence of a system accident is detected, the accident detector 100 determines an accident type and transmits information of the accident type to the arithmetic processor 200. The installation position of the accident detector 100 is not particularly limited, and the accident detector 100 may be mounted, for example, in the same device in which the arithmetic processor 200 or the controller 300 is installed.

The arithmetic processor 200 is installed in a place in which communication with another device is possible and may be installed in the same place in which the accident detector 100 or the controller 300 is installed. The arithmetic processor 200 may have a function of the accident detector 100 or the controller 300. The arithmetic processor 200 is installed in a place in which connection to a load dispatching information network N such as a central load dispatching and liaison office is possible such that system information can be acquired online.

The arithmetic processor 200 includes, for example, a pre-calculator 210 and a post-calculator 220.

Figures 3, 4:
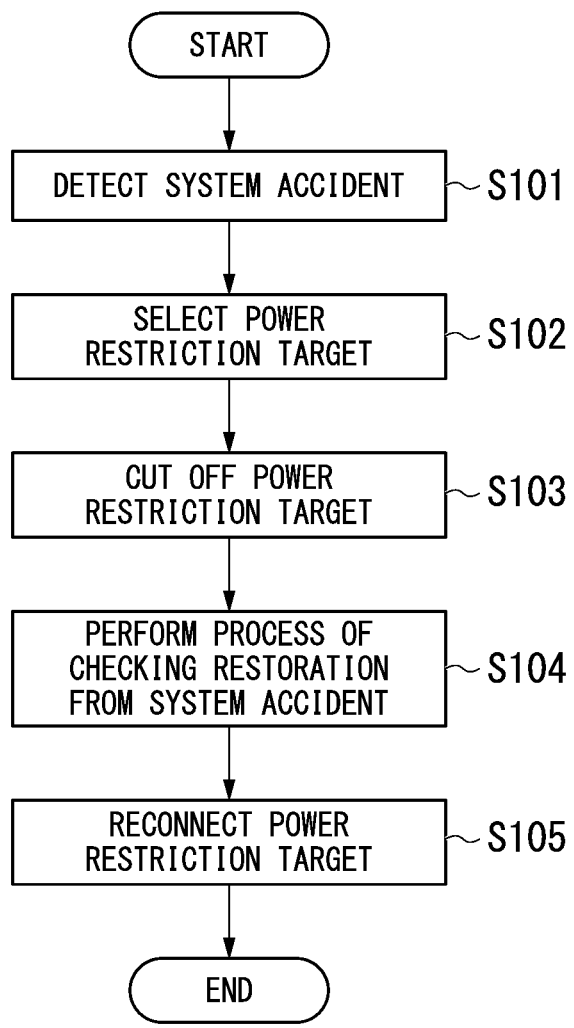
FIG. 3 is a diagram showing an example of details included in a control table.
FIG. 4 is a flowchart showing a routine of processes which are performed by the power system stabilizing system SSC1 according to the first embodiment.

The pre-calculator 210 and the post-calculator 220 may be installed in the same device or may be installed in different devices. The pre-calculator 210 may set a control table on the basis of system information (load dispatching online data) collected from the power system E via the load dispatching information network N, for example, using a method described in Japanese Unexamined Patent Application, First Publication No. 2011-61911, or Japanese Unexamined Patent Application, First Publication No. 2019-126155. For example, the pre-calculator 210 repeatedly performs preparing collecting current system information, preparing an analysis system model, performing transient stability calculation on a plurality of postulated accidents, selecting power restriction targets required for stability maintenance of the power system, setting the power restriction targets in the control table, and updating the control table in a first storage device 500 of the post-calculator 220. FIG. 3 is a diagram showing an example of details included in the control table. In the control table, information of power restriction targets is correlated with each postulated accident type. The postulated accident type includes, for example, a monitoring point (for example, a power line) at which an accident is monitored and information indicating a phase of the accident. The control table includes, for example, a postulated accident type number which is information for identifying an accident type and information of power restriction targets. In the control table shown in FIG. 3, the regenerative power supplies 50-1, 50-2, and 50-3 shown in FIG. 1 are set to be restricted when an accident with a postulated accident type number "1" occurs, and the regenerative power supplies 50-2 and 50-3 are set to be restricted when an accident with a postulated accident type number "2" occurs. The pre-calculator 210 transmits the control table to the post-calculator 220.

The post-calculator 220 includes a first storage device 500, a second storage device 510, a power restriction target selector 520, and a system restoration checker 530.

The control table transmitted from the pre-calculator 210 is stored in the first storage device 500. System information from the power system E and reconnection target setting information for setting whether to reconnect each power restriction target are stored in the second storage device 510. In the reconnection target setting information, information indicating whether a power restriction target is to be selected as a reconnection target is set for each power restriction target. In the following description, a power supply which can be selected as a reconnection target (a power restriction target) is referred to as a "reconnectable power supply." It is preferable that a reconnectable power supply be a regenerative power supply. That is, the power restriction target may include a power supply other than a regenerative power supply, but it is preferable that the reconnection target not include a power supply other than a regenerative power supply.

The power restriction target selector 520 selects power restriction targets required for stability maintenance of the power system E out of a plurality of power supplies connected to the power system E on the basis of the type of the system accident detected by the accident detector 100. The plurality of power supplies connected to the power system E may be only regenerative power supplies or may include regenerative power supplies and power generators other than the regenerative power supplies. The power restriction targets may include only regenerative power supplies or may include regenerative power supplies and power generators other than the regenerative power supplies. The power restriction target selector 520 acquires information on the accident type of the power system E from the accident detector 100, acquires a combination of power restriction targets in the accident type correlated with the accident type through comparison with the control table stored in the first storage device 500, selects the acquired combination of power restriction targets as actual power restriction targets, and transmits a power restriction command to the controller 300 controlling the selected power restriction targets. The power restriction targets are not limited to regenerative power supplies, and may include power generators other than regenerative power supplies.

The system restoration checker 530 performs a restoration checking process of checking whether the power system has been restored from the system accident on the basis of the system information of the power system E. The restoration checking process is continuously performed until it is checked that the power system has been restored from the system accident. When it is checked that the power system has been restored from the system accident, the system restoration checker 530 transmits a power restriction release command to the controller 300.

For example, when the power system E has been restored to a state before the system accident occurred on the basis of the system information of the power system E after the system accident occurred, the system restoration checker 530 may determine that the power system has been restored from the system accident. For example, the system restoration checker 530 may determine whether reclosing has succeeded by a breaker or a disconnector in a place in which the system accident occurred (an accident place) in the main system 10 on the basis of the system information and determine that the power system has been restored from the system accident. Reclosing means, for example, switching a breaker or a disconnector corresponding to the accident place to reconnect the accident place to the power system E after the accident place has been cut off from the power system E by switching the breaker or the disconnector to the unelectrified state. When reclosing has failed, the breaker or the disconnector corresponding to the accident place is controlled in the unelectrified state. Accordingly, the system restoration checker 530 may determine that reclosing has succeeded when the breaker or the disconnector corresponding to the accident place is maintained in the electrified state after reclosing has been performed. The system restoration checker 530 may determine that reclosing has succeeded when the power demand-supply state (for example, a power demand-supply state such as a voltage level, a voltage phase, or a power flow rate of the accident place of the main system 10) after reclosing has been performed has been restored to the power demand-supply state before the system accident occurred. The power demand-supply state before the system accident occurred is stored, for example, in the second storage device 510. The system restoration checker 530 may not determine whether reclosing has succeeded, and may compare the power demand-supply state of the power system E before the system accident occurred with the power demand-supply state after the system accident occurred and determine that the power system has been restored from the system accident when the power demand-supply state after the system accident occurred is restored to the power demand-supply state before the system accident occurred.

The controller 300 includes, for example, a cutoff controller 600 and a reconnection controller 610.

The cutoff controller 600 cuts off the power restriction targets selected by the power restriction target selector 520. For example, the cutoff controller 600 cuts off the power restriction targets by transmitting a cutoff command for the power restriction targets on the basis of the power restriction command received from the post-calculator 220.

When the system restoration checker 530 checks that the power system has been restored from the system accident, the reconnection controller 610 reconnects some or all of reconnectable power supplies to the power system E on the basis of the reconnection target setting information stored in the second storage device 510 out of the power restriction targets cut off by the cutoff controller 600. For example, when the power restriction release command is received from the post-calculator 220, the reconnection controller 610 reconnects the power restriction targets by transmitting a reconnection command for the power restriction targets for which the cutoff command has been output from the cutoff controller 600.

FIG. 4 is a flowchart showing an example of a routine of processes of power restriction and reconnection which is performed by the power system stabilizing system SSC1.

When a system accident occurs in the main system 10, the accident detector 100 detects the system accident and outputs information of a type of the detected system accident to the post-calculator 220 (Step S101). When the type of the system accident is received from the accident detector 100, the power restriction target selector 520 acquires a combination of power restriction targets in the postulated accident type correlated with the received accident type from the control table and selects the acquired combination of power restriction targets as actual power restriction targets (Step S102). The power restriction target selector 520 transmits a power restriction command for controlling the selected power restriction targets to the controller 300. The cutoff controller 600 cuts off the power restriction targets by transmitting a cutoff command for the power restriction targets on the basis of the power restriction command from the power restriction target selector 520 (Step S103). For example, when a regenerative power supply 50-1 and a regenerative power supply 50-2 are selected as the power restriction targets, the cutoff controller 600 controls a breaker 60-1 and a breaker 60-2 such that they are in the unelectrified state to cut off the regenerative power supply 50-1 and the regenerative power supply 50-2 from the main system 10 by outputting the cutoff command to the breaker 60-1 and the breaker 60-2.

After the regenerative power supply 50-1 and the regenerative power supply 50-2 have been disconnected from the main system 10, the system restoration checker 530 performs a restoration checking process of collecting system information from the power system E and checking whether the power system has been restored from the system accident on the basis of the collected system information (Step S104). When restoration from the system accident is checked as the result of the restoration checking process, the system restoration checker 530 transmits a power restriction release command to the controller 300. When the power restriction release command is received from the system restoration checker 530, the reconnection controller 610 reconnects some or all of reconnectable power supplies set in the reconnection target setting information stored in the second storage device 510 out of the power restriction targets cut off in the process of Step S103 as reconnection targets to the power system E by outputting a reconnection command (Step S105). For example, when the regenerative power supply 50-1 and the regenerative power supply 50-2 are cut off from the main system 10 in the process of Step S103, the reconnection controller 610 performs control such that the breaker 60-1 and the breaker 60-2 are switched from the unelectrified state to the electrified state by outputting the reconnection command to the breaker 60-1 and the breaker 60-2, and thus reconnects the regenerative power supply 50-1 and the regenerative power supply 50-2 to the main system 10.

Since the power system stabilizing system SSC1 according to the first embodiment checks restoration from a system accident on the basis of system information of the power system E, it is not necessary to check restoration from the system accident using a human system and it is possible to shorten the stop time of the regenerative power supplies 50. Since the power system stabilizing system SSC1 reconnects cutoff regenerative power supplies 50 after checking restoration from the system accident, it is not necessary to perform a reconnection operation using a human system and it is possible to further shorten the stop time.

Second Embodiment

A power system stabilizing system SSC2 according to a second embodiment will be described below. In the following description, elements having the same functions as described above in the first embodiment will be referred to by the same names and reference signs, and specific description of the functions will be omitted.

Figure 5:
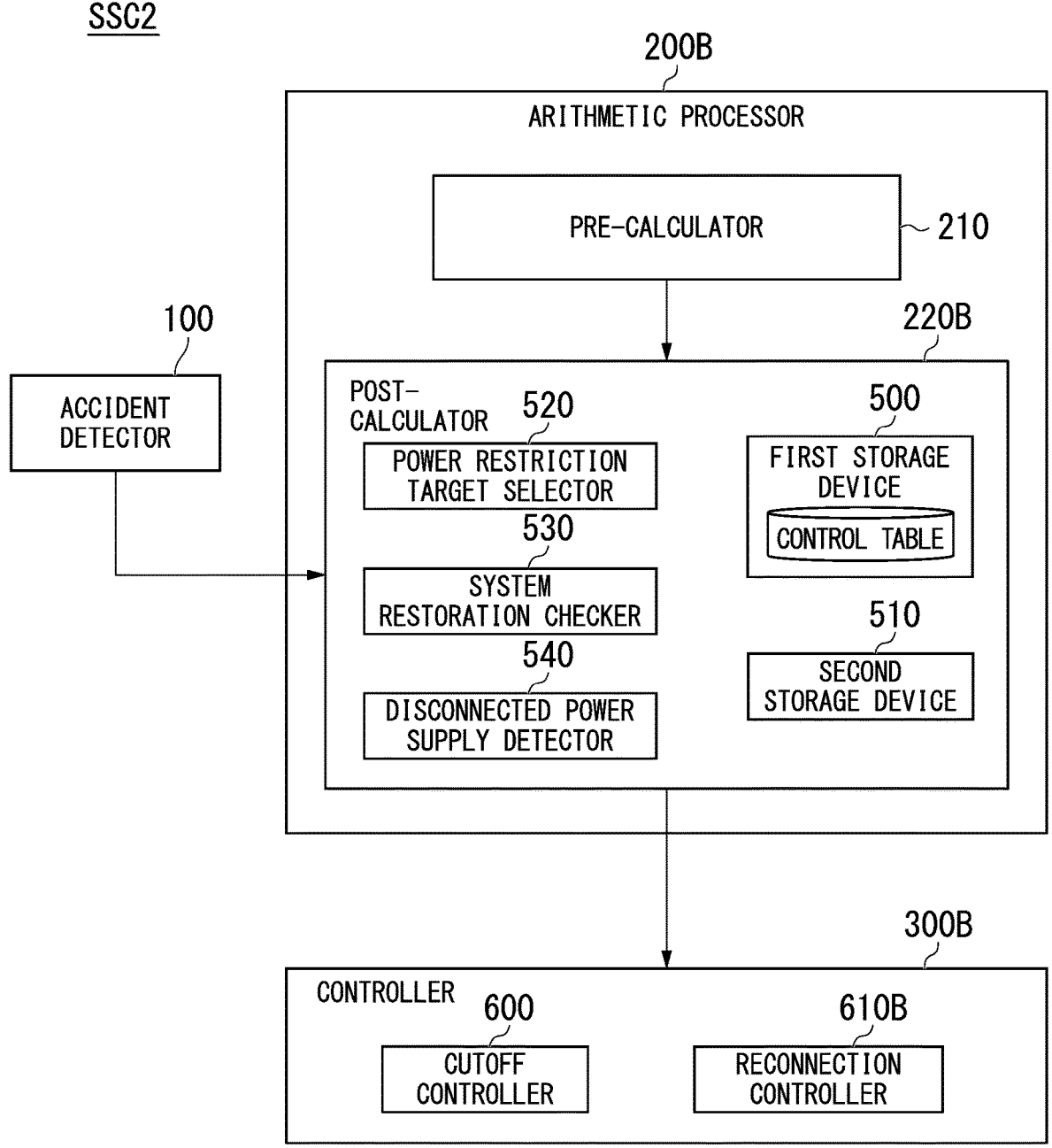
FIG. 5 is a diagram showing a configuration of a power system stabilizing system SSC2 according to a second embodiment.

FIG. 5 is a diagram showing a configuration of the power system stabilizing system SSC2 according to the second embodiment. The power system stabilizing system SSC2 is different from the power system stabilizing system SSC1 according to the first embodiment shown in FIG. 2, in that power supplies disconnected to the power system E are also reconnected in addition to the cutoff power restriction targets.

As shown in FIG. 5, the power system stabilizing system SSC2 includes, for example, an accident detector 100, an arithmetic processor 200B, and a controller 300B. The accident detector 100, the arithmetic processor 200B, and the controller 300B which are constituents of the power system stabilizing system SSC2 are connected by communication equipment 400 (for example, a signal line or a communication device).

The arithmetic processor 200B includes, for example, a pre-calculator 210 and a post-calculator 220B.

The post-calculator 220B includes a first storage device 500, a second storage device 510, a power restriction target selector 520, a system restoration checker 530, and a disconnected power supply detector 540.

The disconnected power supply detector 540 detects regenerative power supplies 50-$k$ which are regenerative power supplies 50 other than the power restriction targets selected by the power restriction target selector 520 and which are disconnected from the power system E out of a plurality of regenerative power supplies 50-$k$. In the following description, a regenerative power supply which is a regenerative power supply 50 other than the power restriction targets and which is disconnected from the power system E may be referred to as a "disconnected power supply."

A disconnected power supply is, for example, a regenerative power supply 50 which is disconnected from the power system E by an isolated operation preventing function of a PCS 52-$k$. The disconnected power supply detector 540 collects system information including disconnection information (for example, information indicating the on/off state of the breaker 60-$k$) indicating whether each regenerative power supply 50-$k$ is disconnected by the isolated operation preventing function from a plurality of PCSs 52-$k$ and detects disconnected power supplies on the basis of the collected system information and information of the power restriction targets. The disconnected power supply detector 540 transmits information of the detected disconnected power supplies to the controller 300B.

The controller 300B includes, for example, a cutoff controller 600 and a reconnection controller 610B.

When the system restoration checker 530 checks that the power system has been restored from the system accident, the reconnection controller 610B reconnects some or all of reconnectable power supplies set in the reconnection target setting information stored in the second storage device 510 out of the power restriction targets cut off by the cutoff controller 600 and some or all of the disconnected power supplies detected by the disconnected power supply detector 540 to the power system E.

Figure 6:
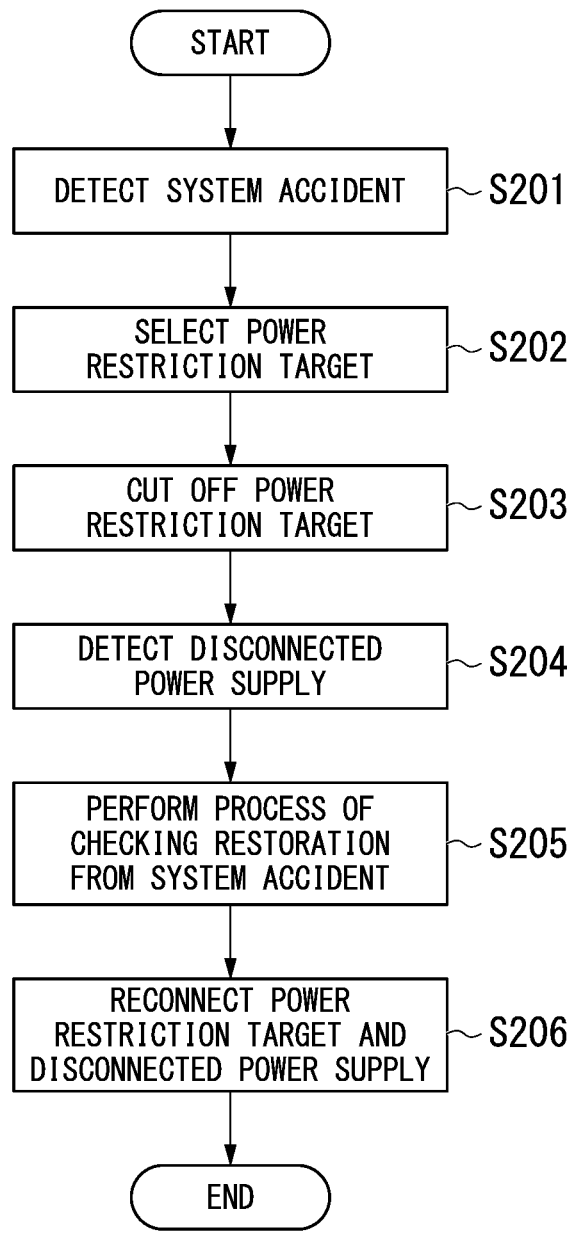
FIG. 6 is a flowchart showing a routine of processes which are performed by the power system stabilizing system SSC2 according to the second embodiment.

FIG. 6 is a flowchart showing an example of a routine of processes of power restriction and reconnection which is performed by the power system stabilizing system SSC2. Steps S201 to S203 in the flowchart shown in FIG. 6 are the same processes as Steps S101 to S103 in the flowchart shown in FIG. 4, and thus description thereof will be omitted.

The disconnected power supply detector 540 detects disconnected power supplies out of a plurality of regenerative power supplies 50-$k$ (Step S204). For example, the disconnected power supply detector 540 detects the disconnected power supplies by comparing information of the power restriction targets selected in Step S202 with the disconnection information received from the power system E. The disconnected power supply detector 540 outputs the information of the disconnected power supplies to the controller 300B. It is also conceivable that there is no disconnected power supply. In this case, the disconnected power supply detector 540 may transmit information indicating that there is no disconnected power supply to the controller 300B. For example, in Step S204, the disconnected power supply detector 540 may detect whether there is a disconnected power supply on the basis of the information of the power restriction targets and the disconnection information, output the information indicating that there is no disconnected power supply to the controller 300B when there is no disconnected power supply, and output information of disconnected power supplies to the controller 300B when the disconnected power supplies are detected.

When a power restriction target is cut off from the main system 10, the system restoration checker 530 performs a restoration checking process on the basis of the system information from the power system E (Step S205). When it is checked that the power system has been restored from the system accident, the system restoration checker 530 transmits a power restriction release command to the controller 300B. When the information of the disconnected power supplies is acquired by the disconnected power supply detector 540 and the power restriction release command is received from the system restoration checker 530, the reconnection controller 610 reconnects some or all of reconnectable power supplies set in the reconnection target setting information stored in the second storage device 510 out of the power restriction targets cut off in the process of Step S203 and some or all of the disconnected power supplies detected in the process of Step S204 as reconnection targets to the power system E by outputting a reconnection command for the power restriction targets and the disconnected power supplies (Step S206). For example, when the regenerative power supply 50-1 and the regenerative power supply 50-2 which are power restriction targets are cut off from the main system 10 in Step S203 and the regenerative power supply 50-3 which is not a power restriction target is disconnected, the regenerative power supply 50-3 is detected as a disconnected power supply in the process of Step S204, and thus the reconnection controller 610 performs control such that the breakers 60-1 to 60-3 are switched from the unelectrified state to the electrified state by outputting the reconnection command to the breakers 60-1 to 60-3 and reconnects the regenerative power supplies 50-1 to 50-3 to the main system 10.

With the power system stabilizing system SSC2 according to the second embodiment, it is possible to achieve the same advantages as in the power system stabilizing system SSC1 according to the first embodiment and it is also possible to shorten the stop time of the regenerative power supplies 50 which have been disconnected due to a reason such as an isolated operation preventing function or an influence of a main system accident other than cutoff control by reconnecting the regenerative power supplies 50 which are disconnected in addition to the power restriction targets as the reconnection targets.

Third Embodiment

A power system stabilizing system SSC3 according to a third embodiment will be described below. In the following description, elements having the same functions as described above in the first embodiment and the second embodiment will be referred to by the same names and reference signs, and specific description of the functions will be omitted.

Figure 7:
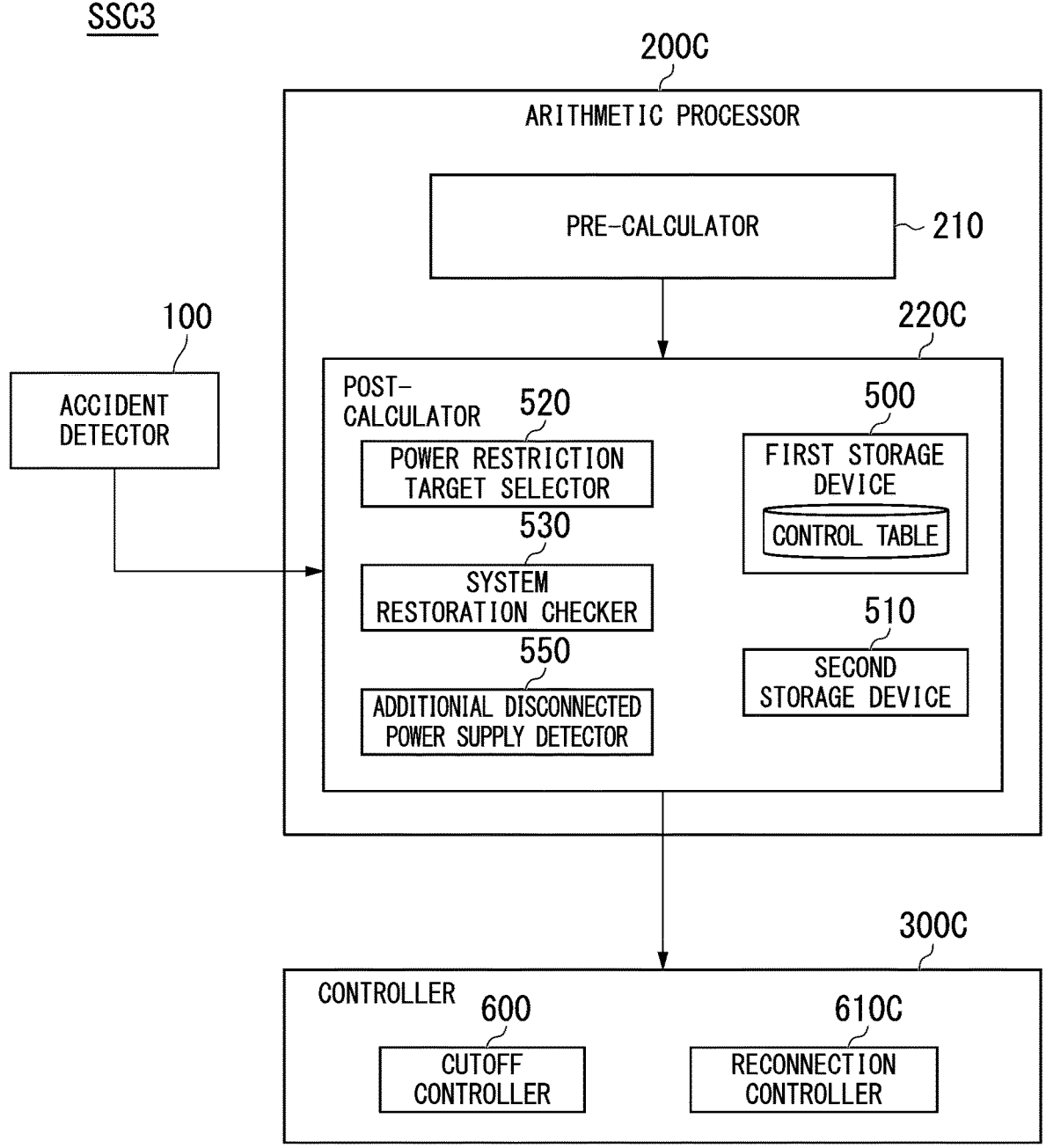
FIG. 7 is a diagram showing a configuration of a power system stabilizing system SSC3 according to a third embodiment.

FIG. 7 is a diagram showing a configuration of the power system stabilizing system SSC3 according to the third embodiment. The power system stabilizing system SSC3 shown in FIG. 7 is different from the power system stabilizing system SSC2 shown in FIG. 5, in that detection of disconnected power supplies is performed after power restriction targets have been reconnected.

As shown in FIG. 7, the power system stabilizing system SSC3 includes, for example, an accident detector 100, an arithmetic processor 200C, and a controller 300C. The accident detector 100, the arithmetic processor 200C, and the controller 300C which are constituents of the power system stabilizing system SSC3 are connected by communication equipment 400 (for example, a signal line or a communication device).

The arithmetic processor 200C includes, for example, a pre-calculator 210 and a post-calculator 220C.

The post-calculator 220C includes a first storage device 500, a second storage device 510, a power restriction target selector 520, a system restoration checker 530, and an additional disconnected power supply detector 550.

The additional disconnected power supply detector 550 detects disconnected power supplies in the same way as the disconnected power supply detector 540. However, the additional disconnected power supply detector 550 performs the process of detecting disconnected power supplies after having reconnected the power restriction targets selected by the power restriction target selector 520. When disconnected power supplies are detected, the additional disconnected power supply detector 550 transmits information of the disconnected power supplies to the controller 300C.

The controller 300C includes, for example, a cutoff controller 600 and a reconnection controller 610C.

When the system restoration checker 530 checks that the power system has been restored from the system accident, the reconnection controller 610C reconnects some or all of reconnectable power supplies set in the reconnection target setting information stored in the second storage device 510 out of the power restriction targets cut off by the cutoff controller 600 to the power system E. The reconnection controller 610C reconnects some or all of the disconnected power supplies detected by the additional disconnected power supply detector 550 to the power system E after having reconnected some or all of the reconnectable power supplies set in the reconnection target setting information stored in the second storage device 510 out of the power restriction targets to the power system E.

Figure 8:
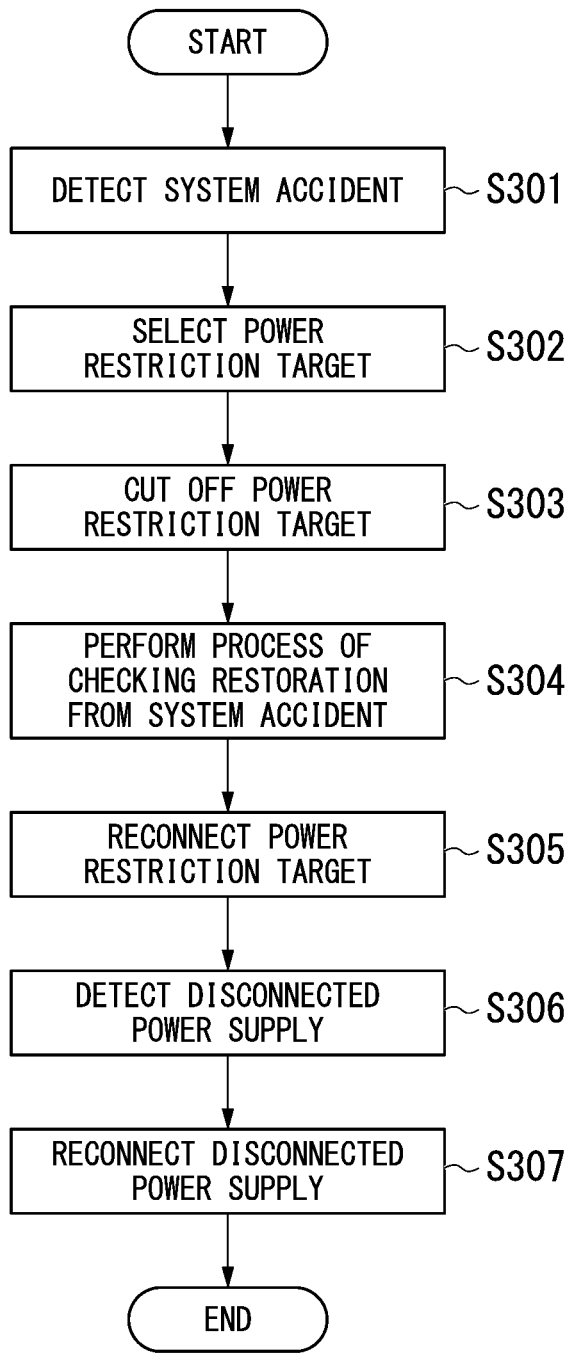
FIG. 8 is a flowchart showing a routine of processes which are performed by the power system stabilizing system SSC3 according to the third embodiment.

FIG. 8 is a flowchart showing an example of a routine of processes of power restriction and reconnection which is performed by the power system stabilizing system SSC3. Steps S301 to S304 in the flowchart shown in FIG. 8 are the same processes as Steps S101 to S104 in the flowchart shown in FIG. 4, and thus description thereof will be omitted.

When a power restriction release command is received from the system restoration checker 530, the reconnection controller 610 reconnects the power restriction targets cut off by the cutoff controller 600 by outputting a reconnection command for the power restriction targets (Step S305).

The additional disconnected power supply detector 550 performs the process of detecting disconnected power supplies after the process of Step S305 has been performed and outputs information of disconnected power supplies to the controller 300C when the disconnected power supplies are detected (Step S306).

When the main system 10 returns to the system state before the system accident occurred and the power restriction targets cut off by the cutoff controller 600 are reconnected to the main system 10, the disconnected power supplies may be reconnected regardless of control by the power system stabilizing system SSC3. In the following description, reconnection of disconnected power supplies regardless of control by the power system stabilizing system SSC3 is referred to as "automatic reconnection." For example, when the power restriction targets cut off by the cutoff controller 600 are reconnected to the main system 10, the main system 10 may be stabilized, the isolated operation preventing function for the disconnected power supplies may be released, and the disconnected power supplies may be automatically reconnected. Accordingly, when reconnection is performed by the power system stabilizing system without considering the automatic reconnection, an unnecessary process of reconnecting the disconnected power supplies which have been automatically reconnected is performed by the power system stabilizing system. Therefore, the power system stabilizing system SSC3 reconnects only disconnected power supplies which have not been automatically reconnected out of a plurality of disconnected power supplies by detecting whether there is a disconnected power supply after automatic reconnection has been performed and performing reconnection in connection of automatic reconnection. For example, the additional disconnected power supply detector 550 performs a process of detecting a disconnected power supply when a predetermined time elapses after the power restriction targets cut off by the cutoff controller 600 have been reconnected. The predetermined time is set in advance to be longer than a time until automatic reconnection is performed after the power restriction targets have been reconnected.

When information of disconnected power supplies is received from the additional disconnected power supply detector 550, the reconnection controller 610C reconnects some or all of the disconnected power supplies detected in Step S306 to the power system E by outputting a reconnection command for the disconnected power supplies (Step S307). For example, it is assumed that the regenerative power supply 50-1 is a power restriction target and the regenerative power supply 50-2 and the regenerative power supply 50-3 are disconnected power supplies. In this case, the regenerative power supply 50-1 is reconnected in Step S305, and the process of detecting a disconnected power supply is performed by the additional disconnected power supply detector 550 when the predetermined time has elapsed thereafter. Here, when the regenerative power supply 50-2 is automatically reconnected with reconnection of the regenerative power supply 50-1, the additional disconnected power supply detector 550 detects only the regenerative power supply 50-3 as the disconnected power supply in Step S306. Accordingly, the reconnection controller 610C reconnects the regenerative power supply 50-3 after having automatically reconnected the regenerative power supply 50-2.

With the power system stabilizing system SSC3 according to the third embodiment, it is possible to achieve the same advantages as in the power system stabilizing system SSC1 according to the first embodiment, and multi-phase reconnection of detecting disconnected power supplies when the predetermined time elapsed after the power restriction targets have been reconnected and then reconnecting the detected disconnected power supplies is performed in consideration of automatic reconnection of a disconnected power supply.

Fourth Embodiment

A power system stabilizing system SSC4 according to a fourth embodiment will be described below. In the following description, elements having the same functions as described above in the first to third embodiments will be referred to by the same names and reference signs, and specific description of the functions will be omitted.

Figure 9:
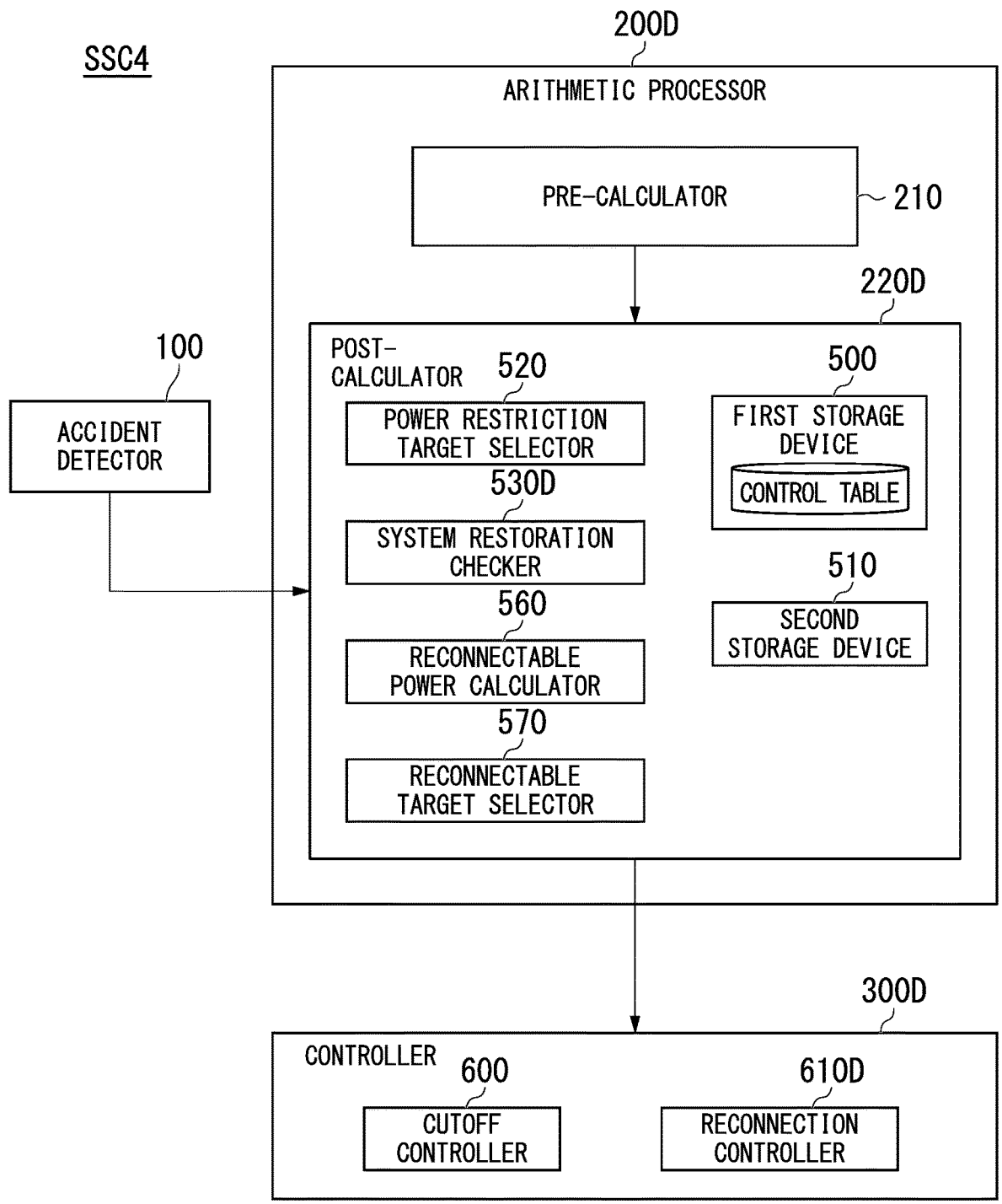
FIG. 9 is a diagram showing a configuration of a power system stabilizing system SSC4 according to a fourth embodiment.

FIG. 9 is a diagram showing a configuration of the power system stabilizing system SSC4 according to the fourth embodiment. The power system stabilizing system SSC4 shown in FIG. 9 is different from the power system stabilizing system SSC1 shown in FIG. 2, in that whether restoration from a system accident is restoration of a partial system from a permanent accident or whether restoration from a system accident is restoration from a transient accident to a system state before the accident occurred on the basis of system information of the power system in the process of checking restoration from the system accident, an amount of reconnectable electric power is calculated when only a partial system is restored from the permanent accident, and regenerative power supplies to be reconnected are selected according to the calculated amount of reconnectable electric power.

As shown in FIG. 9, the power system stabilizing system SSC4 includes, for example, an accident detector 100, an arithmetic processor 200D, and a controller 300D.

The arithmetic processor 200D includes, for example, a pre-calculator 210 and a post-calculator 220D.

The post-calculator 220D includes a first storage device 500, a second storage device 510, a power restriction target selector 520, a system restoration checker 530D, a reconnectable power calculator 560, and a reconnectable target selector 570.

The system restoration checker 530D performs a restoration checking process of checking whether the power system has been restored from a system accident on the basis of the system information of the power system E. As the restoration from a system accident, two restoration states including partial restoration in which only a partial system is restored from a permanent accident and complete restoration in which the power system is restored from a transient accident to a system state before the accident occurred are considered. The system restoration checker 530D determines which of partial restoration and complete restoration the restoration from the system accident is in the restoration checking process. For example, when it is determined that the state (for example, the power demand-supply state) of the power system E checked after the predetermined time has elapsed on the basis of the system information is restored to the state before the system accident occurred, the system restoration checker 530D determines that the restoration from the system accident is complete restoration. For example, when it is determined that the system state (for example, the power demand-supply state) of the power system E checked after the predetermined time has elapsed on the basis of the system information is not restored to the system state before the system accident occurred, the system restoration checker 530D may determine that the restoration from the system accident is partial restoration.

The system restoration checker 530D may determine that the restoration from the system accident is complete restoration, for example, through the same process as the restoration checking process in the first embodiment. For example, when a demand-supply state (for example, a voltage level, a voltage phase, or a power flow rate in an accident place of the main system 10) of the power system E when the predetermined time has elapsed after the system accident occurred is not restored to the demand-supply state before the system accident occurred but is restored to a predetermined level, the system restoration checker 530D may determine that the restoration from the system accident is partial restoration.

When the system restoration checker 530D determines that the restoration from the system accident is partial restoration, the reconnectable power calculator 560 calculates a reconnectable power which is an amount of electric power which can be supplied to the main system 10 through reconnection. The reconnectable power is, for example, an upper limit of the reconnectable power in consideration of whether an overload occurred after the reconnection. For example, the reconnectable power calculator 560 calculates the reconnectable power by performing power flow calculation or the like using current system information.

The reconnectable target selector 570 selects reconnectable targets out of power supplies which are disconnected such that the total value of amounts of electric power (reconnection powers) supplied from all the reconnected regenerative power supplies 50-$k$ to the main system 10 when the regenerative power supplies 50-$k$ are reconnected to the power system E is less than the reconnectable power calculated by the reconnectable power calculator 560. The power supplies which are disconnected may be reconnectable power supplies set in the reconnection target setting information stored in the second storage device 510 out of the disconnected power restriction targets, may be disconnected power supplies, or may be both thereof. The reconnectable target selector 570 selects the reconnection targets such that the total value of reconnectable powers is less than the reconnectable power calculated by the reconnectable power checker 14 through calculation such as optimal combination or quasi-optimal combination on the basis of a preset priority order. For example, the reconnectable target selector 570 acquires reconnectable powers of the regenerative power supplies 50 which are disconnected out of information of outputs of the regenerative power supplies 50-$k$ or information of the loads included in the system information. Then, the reconnectable target selector 570 selects the reconnection targets out of the power restriction targets such that the total value of the reconnection powers is less than the reconnectable power on the basis of the priority order in which a power restriction target has a higher priority than a disconnected power supply. It is preferable that the total value of the reconnection powers be as close to the reconnectable power calculated by the reconnectable power checker 14 as possible. When a load is connected to an external system 12-$k$, a value obtained by subtracting an amount of electric power consumed in the load from the outputs of the regenerative power supplies 50-$k$ may be defined as the reconnection power. The reconnectable target selector 570 transmits information of the selected reconnection targets to the controller 300D.

The controller 300D includes, for example, a cutoff controller 600 and a reconnection controller 610D.

The reconnection controller 610D reconnects some or all of the reconnectable power supplies set in the reconnection target setting information stored in the second storage device 510 out of the power restriction targets cut off by the cutoff controller 600 to the power system E when the system restoration checker 530D determines that the power system is restored from a transient accident to the system state before the system accident occurred, and reconnects only the reconnection targets selected by the reconnectable target selector 570 to the power system E when the system restoration checker 530 determines that only a partial system is restored from a permanent accident which is the main system accident.

Figure 10:
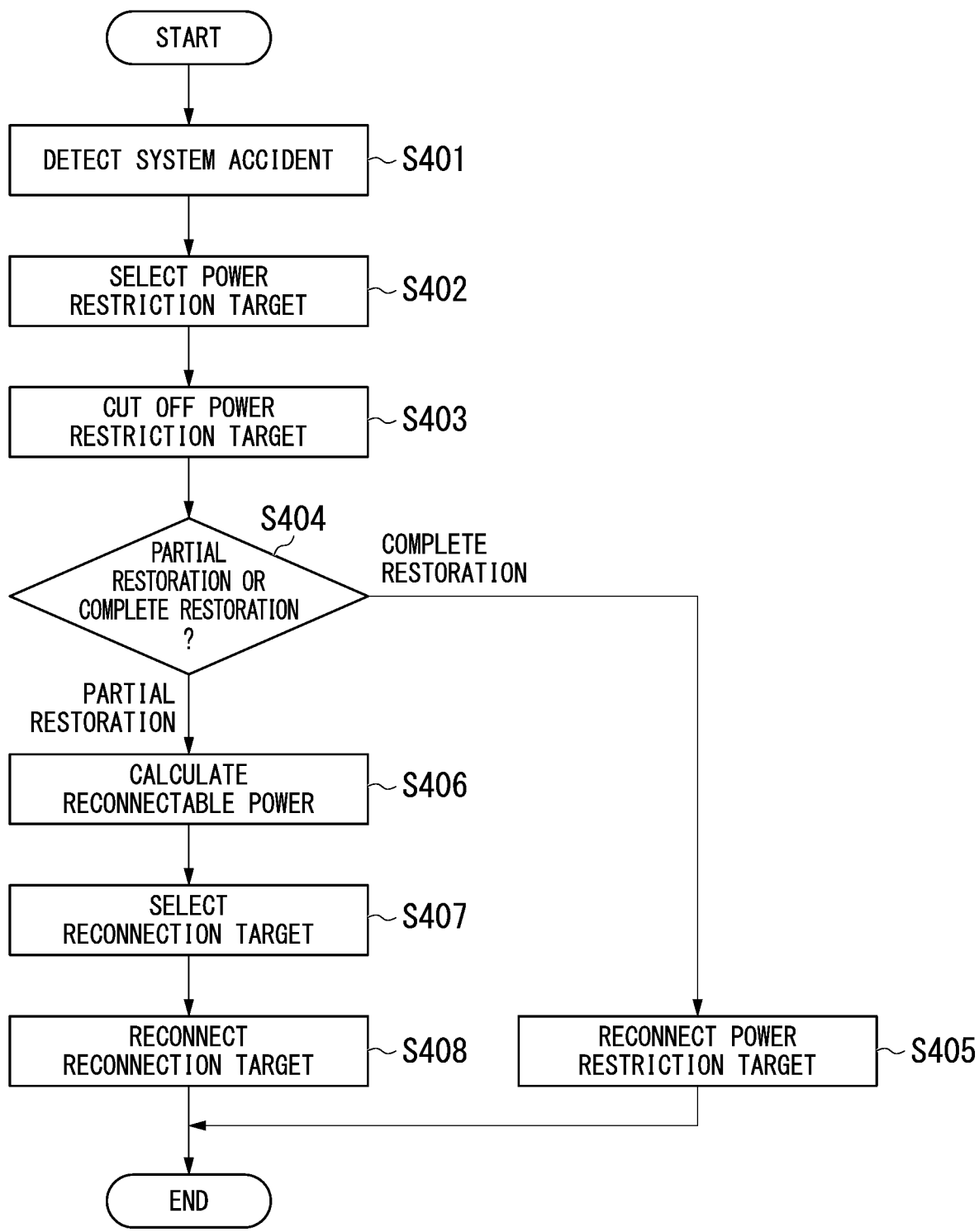
FIG. 10 is a flowchart showing a routine of processes which are performed by the power system stabilizing system SSC4 according to the fourth embodiment.

FIG. 10 is a flowchart showing an example of a routine of processes of power restriction and reconnection which is performed by the power system stabilizing system SSC4. Steps S401 to S403 in the flowchart shown in FIG. 10 are the same processes as Steps S101 to S103 in the flowchart shown in FIG. 4, and thus description thereof will be omitted.

The system restoration checker 530 determines which of partial restoration and complete restoration the restoration from the system accident is when a power restriction target is cut off (Step S404) and transmits a power restriction command to the controller 300D when it is determined that the restoration from the system accident is complete restoration. The reconnection controller 610D reconnects all the power restriction targets by outputting a cutoff command for some or all of the reconnectable power supplies set in the reconnection target setting information stored in the second storage device 510 out of the power restriction targets cut off in Step S403 when the power restriction command is received (Step S405). When it is determined in Step S403 that the restoration from the system accident is partial restoration, the process of Step S405 is not performed, and calculation of a reconnectable power (Step S406) and selection of reconnection targets based on the reconnectable power (Step S407) are performed. Then, the reconnection controller 610D reconnects the reconnection targets to the power system E by outputting a reconnection command to all the breakers 60-$k$ of the reconnection targets selected in Step S407 (Step S408).

With the power system stabilizing system SSC4 according to the fourth embodiment, it is possible to achieve the same advantages as in the power system stabilizing system SSC1 according to the first embodiment. In addition, when only a partial system is restored from a permanent accident, it is possible to minimize the number of regenerative power supplies 50 to be stopped by calculating an optimal reconnection power based on the system information and reconnecting the regenerative power supplies 50 according to the reconnection power.

Fifth Embodiment

A power system stabilizing system SSC5 according to a fifth embodiment will be described below. In the following description, elements having the same functions as described above in the first to fourth embodiments will be referred to by the same names and reference signs, and specific description of the functions will be omitted.

Figure 11:
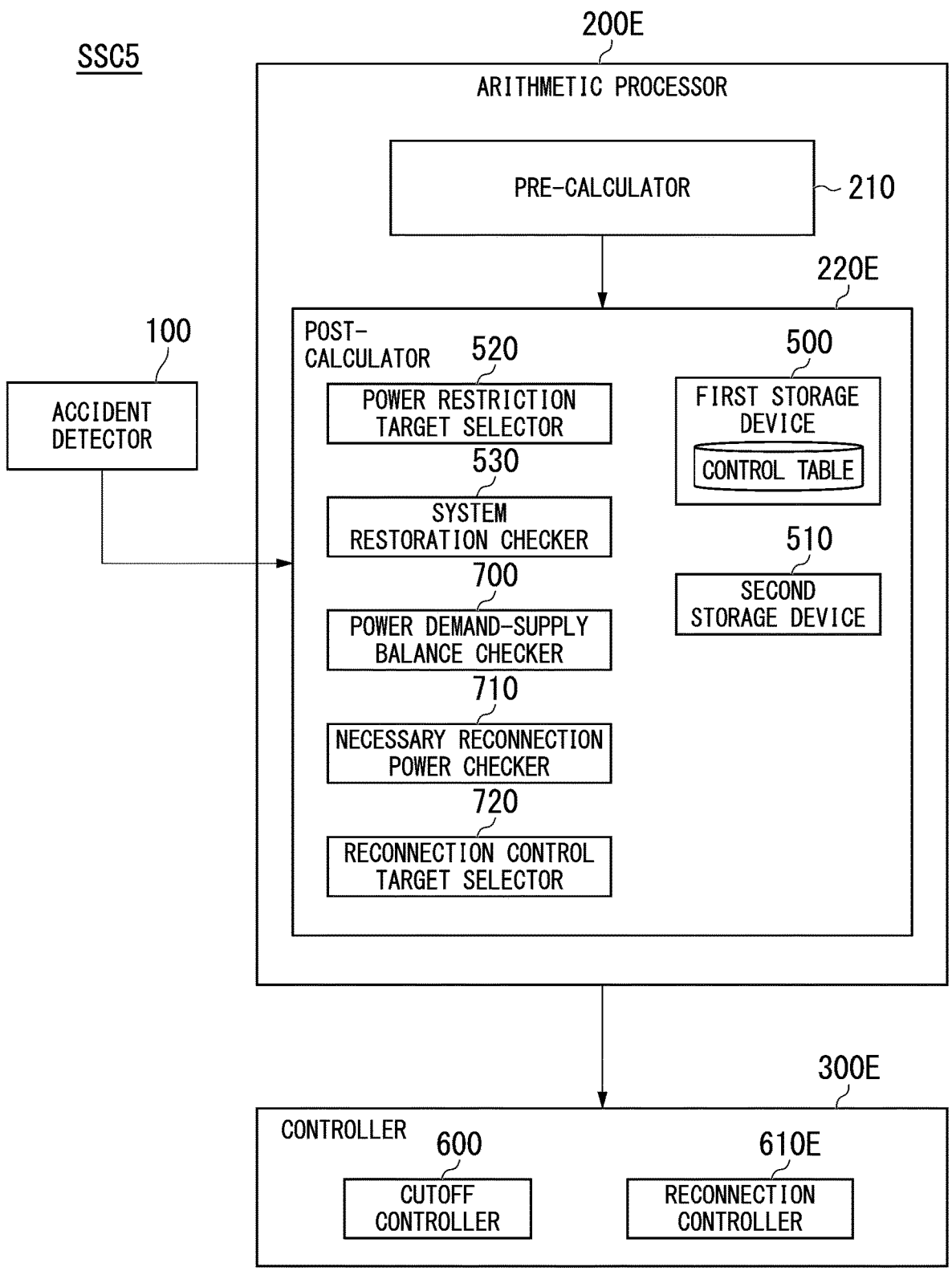
FIG. 11 is a diagram showing a configuration of a power system stabilizing system SSC5 according to a fifth embodiment.

FIG. 11 is a diagram showing a configuration of the power system stabilizing system SSC5 according to the fifth embodiment. The power system stabilizing system SSC5 shown in FIG. 11 is different from the power system stabilizing system SSC1 shown in FIG. 2, in that a reconnection target is selected in consideration of a power demand-supply balance of the main system 10.

As shown in FIG. 11, the power system stabilizing system SSC5 includes, for example, an accident detector 100, an arithmetic processor 200E, and a controller 300E.

The arithmetic processor 200E includes, for example, a pre-calculator 210 and a post-calculator 220E.

The post-calculator 220E includes a first storage device 500, a second storage device 510, a power restriction target selector 520, a system restoration checker 530, a power demand-supply balance checker 700, a necessary reconnection power calculator 710, and a reconnection control target selector 720.

The power demand-supply balance checker 700 checks whether an abnormality of a power demand-supply balance has occurred in the main system 10 in a state in which power restriction targets are cut off. Whether an abnormality of the power demand-supply balance has occurred in the main system 10 may be checked by the power demand-supply balance checker 700, for example, on the basis of an abnormality in level of a frequency or a rate of change of the frequency of the main system 10. An example of an abnormality in level of the frequency is, for example, that the level of the frequency is outside of a predetermined range. An abnormality of the rate of change of the frequency is, for example, that the rate of change of the frequency is greater than a predetermined value for determining whether the rate of change of the frequency is abnormal.

When an abnormality of the power demand-supply balance has been checked by the power demand-supply balance checker 700, the necessary reconnection power calculator 710 calculates a reconnection power necessary for releasing an abnormality of the power demand-supply balance (hereinafter referred to as a "necessary reconnection power"). When it is considered that the abnormality of the power demand-supply balance of the main system 10 is released by reconnecting the regenerative power supplies 50-$k$, it may not be effective even if the total value of amounts of electric power supplied from the reconnection targets to the main system 10 is much greater or less than the necessary reconnection power. On the other hand, it may be difficult to select the reconnection targets such that the total value is equal to the necessary reconnection power. Accordingly, the necessary reconnection power calculator 710 may calculate only one necessary reconnection power, but preferably calculates two necessary reconnection powers including an upper limit and a lower limit. Power flow calculating using system information or the like can be used to calculate the necessary reconnection power.

The reconnection control target selector 720 selects reconnection targets required for releasing an abnormality of the power demand-supply balance on the basis of the necessary reconnection power. For example, the reconnection control target selector 720 selects regenerative power supplies 50 which are reconnection targets such that the total value of amounts of electric power supplied to the main system 10 by reconnecting the regenerative power supplies 50-$k$ reaches the necessary reconnection power calculated by the necessary reconnection power calculator 710. For example, when one necessary reconnection power is calculated by the necessary reconnection power calculator 710, the reconnection control target selector 720 selects the reconnection targets out of regenerative power supplies 50-$k$ which are disconnected such as the reconnectable power supplies set in the reconnection target setting information stored in the second storage device 510 out of the power restriction targets or the disconnected power supplies such that the total value is as close to the necessary reconnection power as possible. For example, when two necessary reconnection powers including the upper limit and the lower limit are calculated by the necessary reconnection power calculator 710, the reconnection control target selector 720 selects the reconnection targets out of regenerative power supplies 50-$k$ which are disconnected such as the reconnectable power supplies set in the reconnection target setting information stored in the second storage device 510 out of the power restriction targets or the disconnected power supplies such that the total value is in a range defined by the upper limit and the lower limit. Similarly to the method used by the reconnectable target selector 570, a method of selecting the reconnection targets such that the total value of reconnection powers calculated through calculation such as optimal combination or quasi-optimal combination on the basis of the preset priority order is equal to a value calculated as the necessary reconnection power or the like can be considered as the method of selecting the reconnection targets. The reconnection control target selector 720 transmits information of the selected reconnection targets to the controller 300E.

The controller 300E includes, for example, a cutoff controller 600 and a reconnection controller 610E.

The reconnection controller 610E reconnects only the reconnection targets selected by the reconnection control target selector 720 to the power system E.

Figure 12:
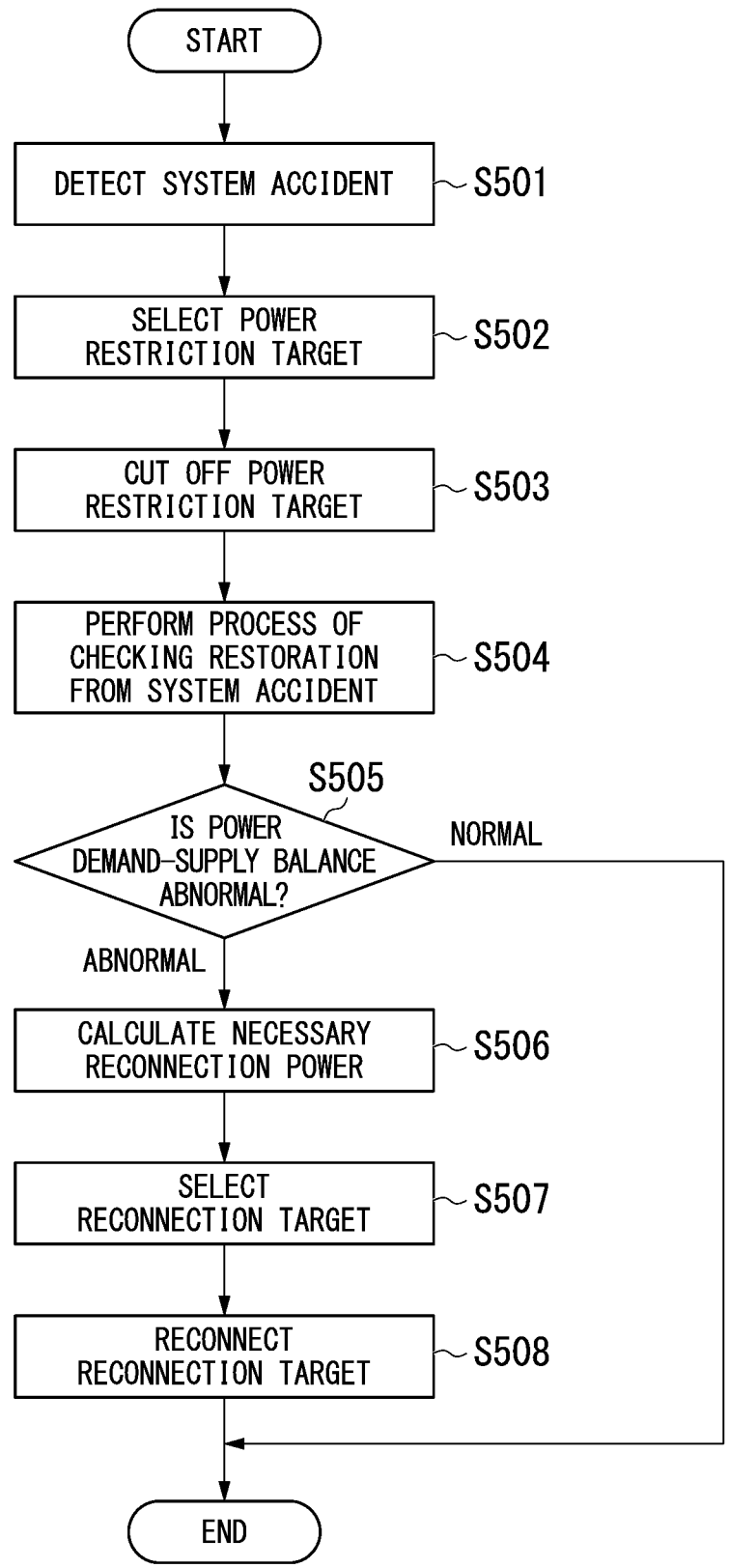
FIG. 12 is a flowchart showing a routine of processes which are performed by the power system stabilizing system SSC5 according to the fifth embodiment.

FIG. 12 is a flowchart showing an example of a routine of processes of power restriction and reconnection which is performed by the power system stabilizing system SSC5. Steps S501 to S504 in the flowchart shown in FIG. 10 are the same processes as Steps S101 to S104 in the flowchart shown in FIG. 4, and thus description thereof will be omitted.

When a power supply which is not assumed beforehand drops due to a main system accident, an abnormality of the power demand-supply balance may not be released even if onset control for cutting off power restriction targets is performed in Step S503. Accordingly, the power system stabilizing system SSC5 checks the power demand-supply balance after the onset control and reconnects regenerative power supplies 50 for supplying an amount of electric power for releasing an abnormality of the power demand-supply balance to the power system E when the abnormality of the power demand-supply balance is not released.

For example, when the system restoration checker 530 checks that restoration from the system accident has been completed (Step S504), the power demand-supply balance checker 700 determines whether an abnormality of the power demand-supply balance of the main system 10 has occurred in a state in which the power restriction targets are cut off (Step S505). When it is determined in Step S505 that an abnormality of the power demand-supply balance has not occurred (the power demand-supply balance is normal), the controller 300E does not perform reconnection of the regenerative power supplies 50-$k$. When it is determined in Step S505 that an abnormality of the power demand-supply balance has occurred, calculation of a necessary reconnection power which is an amount of electric power for releasing the abnormality of the power demand-supply balance (Step S506) and selection of reconnection targets based on the necessary reconnection power (Step S507) are performed. Then, the reconnection controller 610D reconnects the reconnection targets to the power system E by outputting a reconnection command to all the breakers 60-$k$ of the reconnection targets selected in Step S507 (Step S508).

With the power system stabilizing system SSC5 according to the fifth embodiment, it is possible to achieve the same advantages as in the power system stabilizing system SSC1 according to the first embodiment. In addition, it is possible to curb deterioration in system stability by reconnecting appropriate regenerative power supplies 50 according to an amount of electric power necessary for releasing an abnormality of the power demand-supply balance in consideration of the power demand-supply balance.

Sixth Embodiment

A power system stabilizing system SSC6 according to a sixth embodiment will be described below. In the following description, elements having the same functions as described above in the first to fifth embodiments will be referred to by the same names and reference signs, and specific description of the functions will be omitted.

Figure 13:
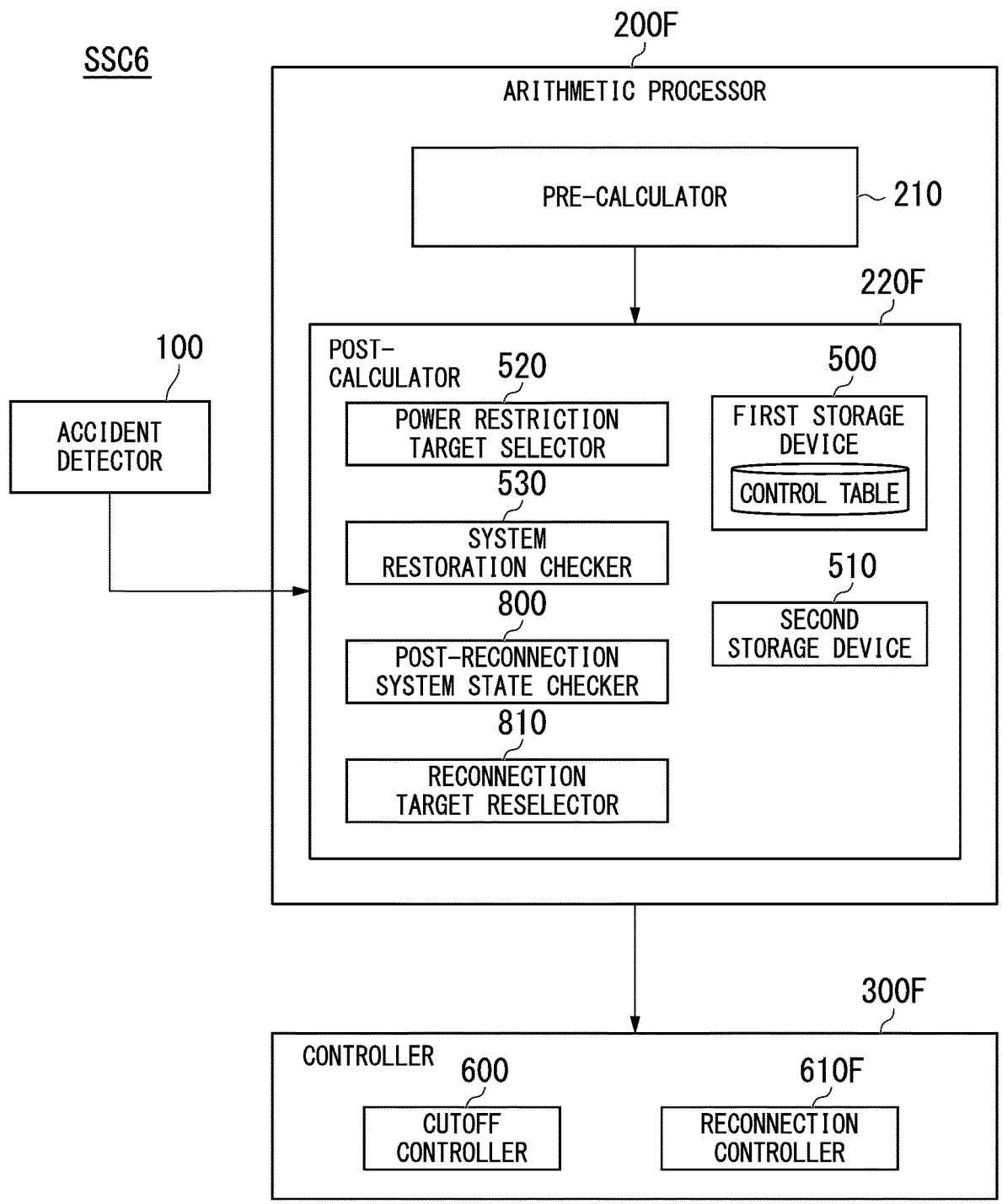
FIG. 13 is a diagram showing a configuration of a power system stabilizing system SSC6 according to a sixth embodiment.

FIG. 13 is a diagram showing a configuration of the power system stabilizing system SSC6 according to the sixth embodiment. The power system stabilizing system SSC6 shown in FIG. 13 is different from the power system stabilizing system SSC1 shown in FIG. 2, in that it is checked that reconnection of regenerative power supplies 50 to the power system E does not cause any problem before reconnection is actually performed.

As shown in FIG. 13, the power system stabilizing system SSC6 includes, for example, an accident detector 100, an arithmetic processor 200F, and a controller 300F.

The arithmetic processor 200F includes, for example, a pre-calculator 210 and a post-calculator 220F.

The post-calculator 220F includes a first storage device 500, a second storage device 510, a power restriction target selector 520, a system restoration checker 530, a post-reconnection system state checker 800, and a reconnection target reselector 810.

When the power system is restored from a system accident, the post-reconnection system state checker 800 selects all the reconnectable power supplies set in the reconnection target setting information stored in the second storage device 510 out of the power restriction targets as reconnection targets and checks whether a system abnormality will occur in the main system 10 when the selected power supplies are reconnected to the power system E. The system abnormality is, for example, an abnormal phenomenon such as an abnormality in frequency (such as an increase in frequency) or an overload. For example, power flow calculation using the system information can be used to check the system abnormality. The post-reconnection system state checker 800 may perform a check by predicting outputs of reconnected power restriction targets or disconnected power supplies from maximum values of the outputs, outputs of near regenerative power supplies 50-$k$, or the like.

When the post-reconnection system state checker 800 checks that a system abnormality occurs, the reconnection target reselector 810 reselects reconnection targets. Reduction of selection targets based on a preset priority order or the like can be used to reselect reconnection targets. For example, when the post-reconnection system state checker 800 checks that a system abnormality occurs, the reconnection target reselector 810 may perform the reselection by more preferentially reducing the disconnected power supplies than the power restriction targets out of the selected reconnection targets or may perform the reselection by preferentially reducing the regenerative power supplies 50 of which an output is low when they are reconnected. When the reconnection targets are reselected, the post-reconnection system state checker 800 checks whether a system abnormality occurs when the reconnection targets selected through the reselection are reconnected. The reselection of reconnection targets is repeatedly performed until the post-reconnection system state checker 800 checks that a system abnormality does not occur.

The controller 300F includes, for example, a cutoff controller 600 and a reconnection controller 610F.

When the post-reconnection system state checker 800 checks that a system abnormality does not occur, the reconnection controller 610F reconnects the reconnection targets selected at that time to the power system E.

Figure 14:
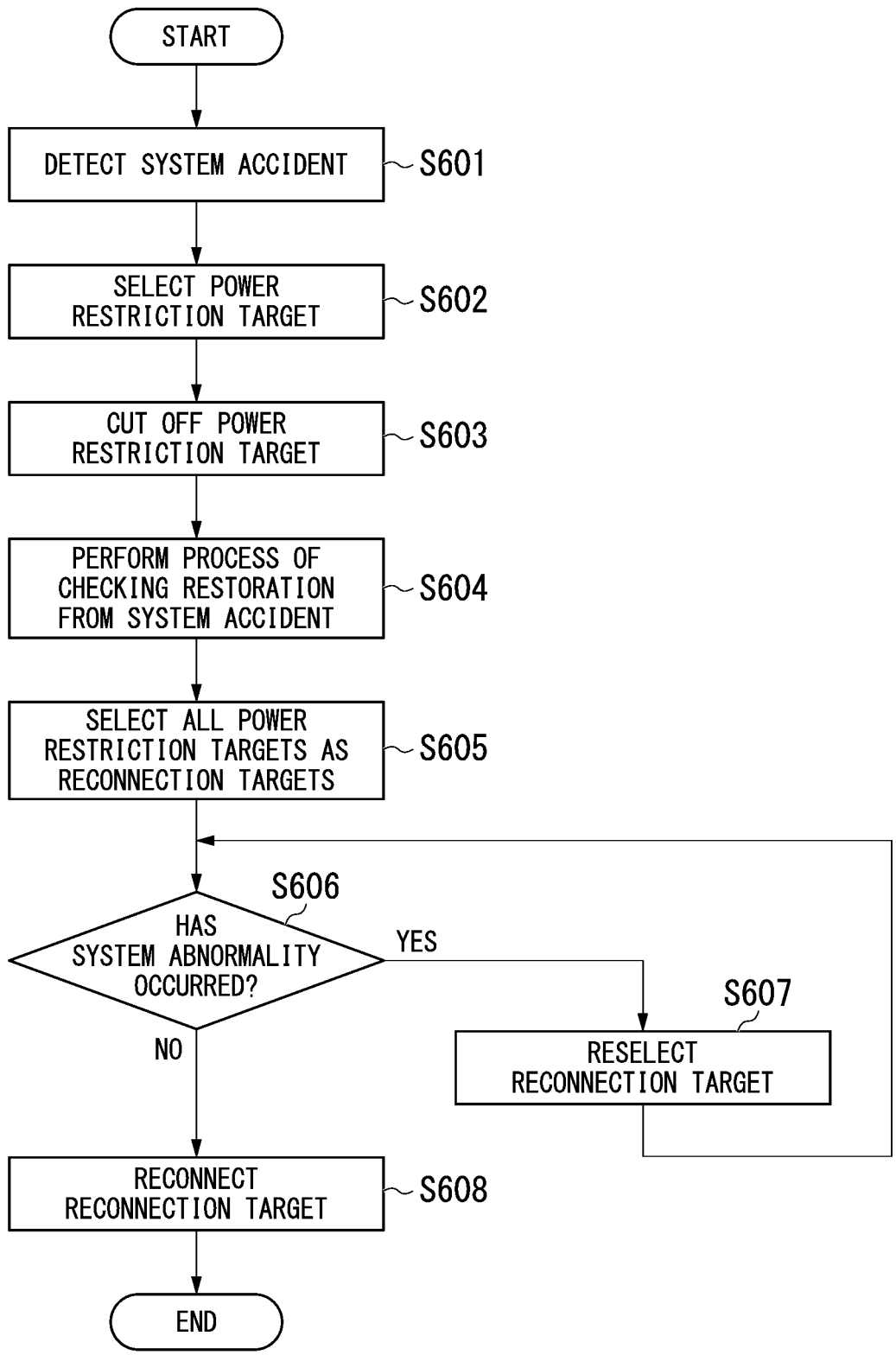
FIG. 14 is a flowchart showing a routine of processes which are performed by the power system stabilizing system SSC4 according to the sixth embodiment.

FIG. 14 is a flowchart showing an example of a routine of processes of power restriction and reconnection which is performed by the power system stabilizing system SSC6. Steps S601 to S604 in the flowchart shown in FIG. 14 are the same processes as Steps S101 to S104 in the flowchart shown in FIG. 4, and thus description thereof will be omitted.

When the system restoration checker 530 checks restoration from the system accident (Step S604), the post-reconnection system state checker 800 selects all the reconnectable power supplies set in the reconnection target setting information stored in the second storage device 510 out of the power restriction targets as reconnection targets (Step S605) and checks whether a system abnormality occurs in the main system 10 when the selected power restriction targets are reconnected to the power system E (Step S606). When it is checked in Step S606 that a system abnormality does not occur, the system restoration checker 530 transmits information of the reconnection targets selected at that time to the controller 300F. When it is checked in Step S606 that a system abnormality occurs, the reconnection target reselector 810 reselects reconnection targets (Step S607), and it is checked again in Step S606 whether a system abnormality occurs in the main system 10 when the reselected reconnection targets are reconnected to the power system E. The reconnection controller 610D reconnects the reconnection targets to the power system E by outputting a reconnection command to all the breakers 60-$k$ of the selected reconnection targets (Step S608).

With the power system stabilizing system SSC6 according to the sixth embodiment, it is possible to achieve the same advantages as in the power system stabilizing system SSC1 according to the first embodiment. In addition, by checking whether a system abnormality occurs due to reconnection beforehand when the regenerative power supplies 50-$k$ are reconnected in consideration of that the regenerative power supplies 50-$k$ are variable power supplies of which an output varies depending on weather conditions or the like and reconnecting only the reconnection targets checked not to cause a system abnormality, it is possible to curb occurrence of an unnecessary system abnormality such as deterioration in system stability due to the reconnection.

The post-reconnection system state checker 800 and the reconnection target reselector 810 according to the sixth embodiment can be applied to the second to fifth embodiments. For example, when the post-reconnection system state checker 800 is applied to the second embodiment, the post-reconnection system state checker 800 may select the reconnectable power supplies set in the reconnection target setting information stored in the second storage device 510 out of the power restriction targets and the disconnected power supplies as reconnection targets and check whether a system abnormality occurs before Step S206. For example, when the post-reconnection system state checker 800 is applied to the third embodiment, the post-reconnection system state checker 800 may select the power restriction targets as reconnection targets and check whether a system abnormality occurs before Step S305 and may select the disconnected power supplies as reconnection targets and check whether a system abnormality occurs before Step S307. For example, when the post-reconnection system state checker 800 is applied to the fourth embodiment, the post-reconnection system state checker 800 may check whether a system abnormality occurs in the reconnection targets selected in Step S407 before Step S408. For example, when the post-reconnection system state checker 800 is applied to the fifth embodiment, the post-reconnection system state checker 800 may check whether a system abnormality occurs in the reconnection targets selected in Step S507 before Step S508.

Seventh Embodiment

A power system stabilizing system SSC7 according to a seventh embodiment will be described below. In the following description, elements having the same functions as described above in the first to sixth embodiments will be referred to by the same names and reference signs, and specific description of the functions will be omitted.

Figure 15:
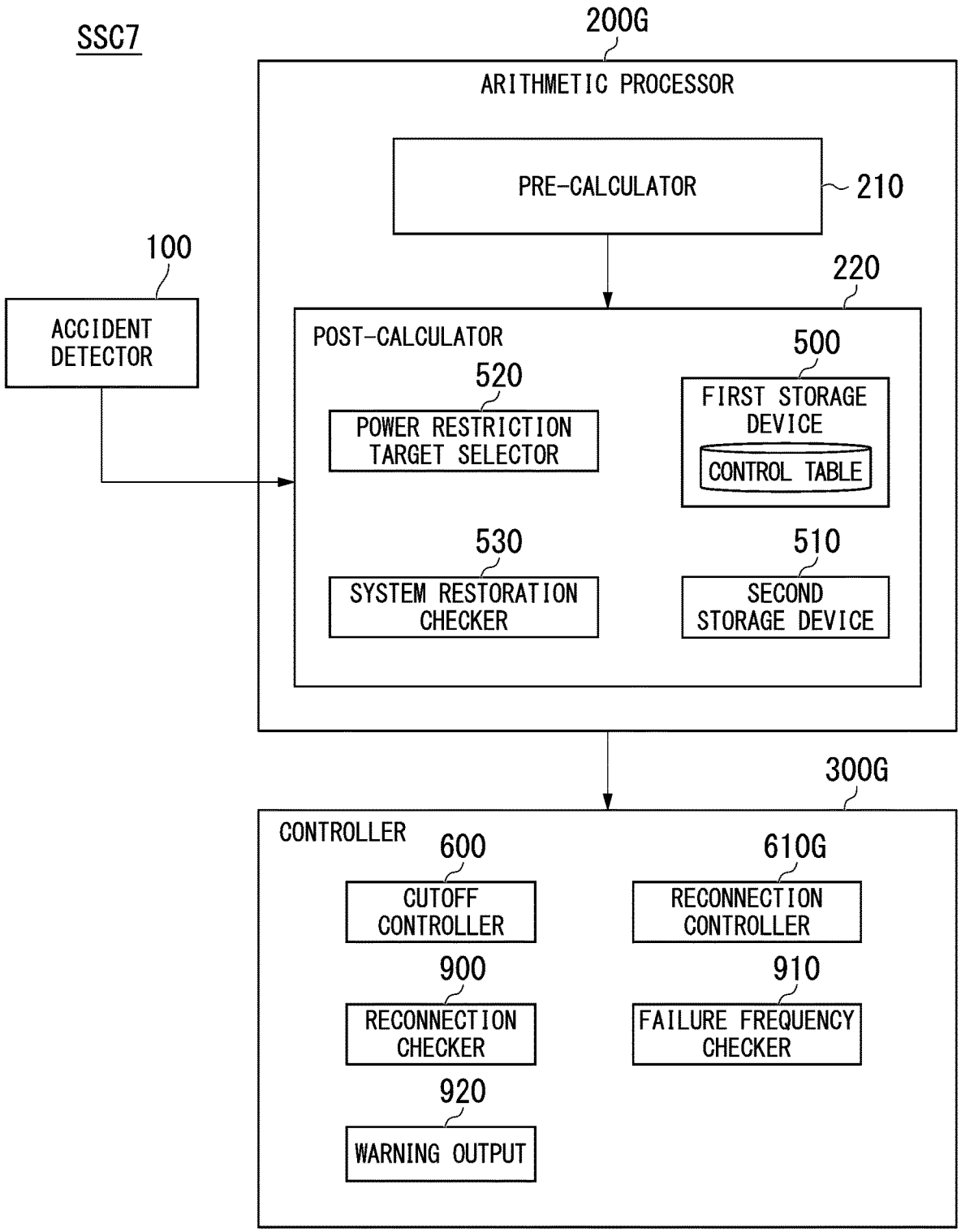
FIG. 15 is a diagram showing a configuration of a power system stabilizing system SSC7 according to a seventh embodiment.

FIG. 15 is a diagram showing a configuration of the power system stabilizing system SSC7 according to the seventh embodiment. The power system stabilizing system SSC7 shown in FIG. 15 is different from the power system stabilizing system SSC1 shown in FIG. 2, in that a reconnection checker 900, a failure frequency checker 910, and a warning output 920 are provided.

As shown in FIG. 15, the power system stabilizing system SSC7 includes, for example, an accident detector 100, an arithmetic processor 200, and a controller 300G.

The controller 300G includes, for example, a cutoff controller 600, a reconnection controller 610G, a reconnection checker 900, a failure frequency checker 910, and a warning output 920. The warning output 920 may be provided in the arithmetic processor 200.

The reconnection controller 610G has the function of the reconnection controller 610.

After the reconnection controller 610G has output a reconnection command for reconnection targets, the reconnection checker 900 checks whether reconnection of the reconnection targets has failed for each reconnection target. For example, the reconnection checker 900 checks connection states of the breakers 60-$k$ corresponding to the reconnection targets on the basis of connection information of the breakers 60-$k$ included in the system information after the reconnection command has been output, determines that the reconnection has succeeded when the connection states are the electrified state, and determines that the reconnection has failed when the connection states are the unelectrified state.

The failure frequency checker 910 counts the number of failures (hereinafter referred to as a "failure frequency") S determined by the reconnection checker 900 for each reconnection target. The failure frequency checker 910 compares the counted failure frequency S with a preset upper limit Sth and notifies the warning output 920 when the failure frequency S is greater than the upper limit Sth. For example, the failure frequency checker 910 may notify the warning output 920 of information of the reconnection targets in which the failure frequency S is greater than the upper limit Sth.

The warning output 920 transmits warning information including information indicating that the reconnection has failed to the outside (for example, an external communication terminal) in a predetermined format. The communication terminal is, for example, a computer or a mobile terminal (for example, a smartphone or a tablet terminal) which is owned by an operator or a manager of the power system stabilizing system SSC7. The predetermined format may be electronic mail notification to the communication terminal, display of text information on a screen of the communication terminal, or output of vocal information from a speaker of the communication terminal. The warning information may include at least one of information of a reconnection target of which the failure frequency is greater than the upper limit, information of a position of the reconnection target, and information of the breaker 60-$k$ corresponding to the reconnection target.

Figure 16:
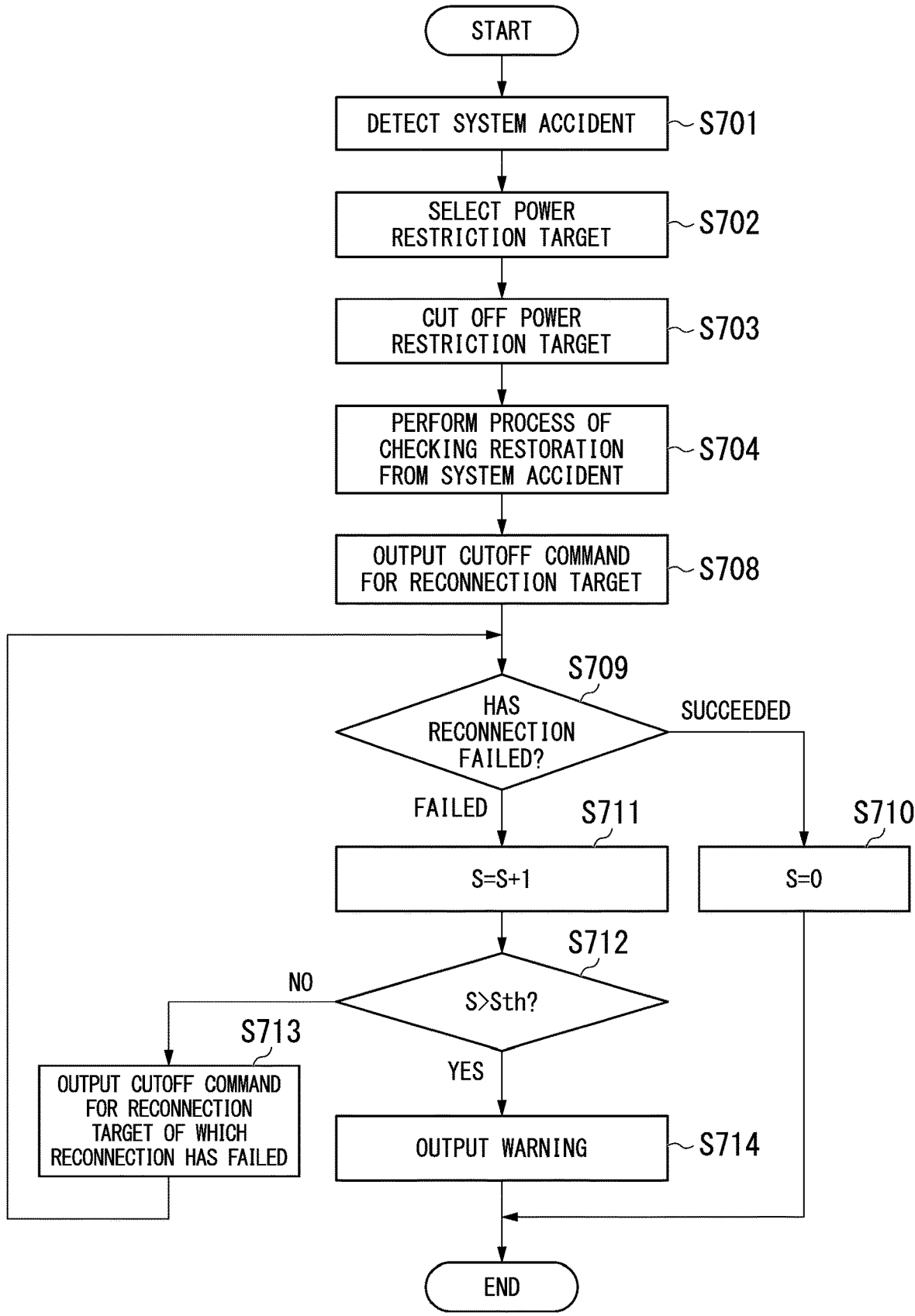
FIG. 16 is a flowchart showing a routine of processes which are performed by the power system stabilizing system SSC7 according to the seventh embodiment.
Figure 17:
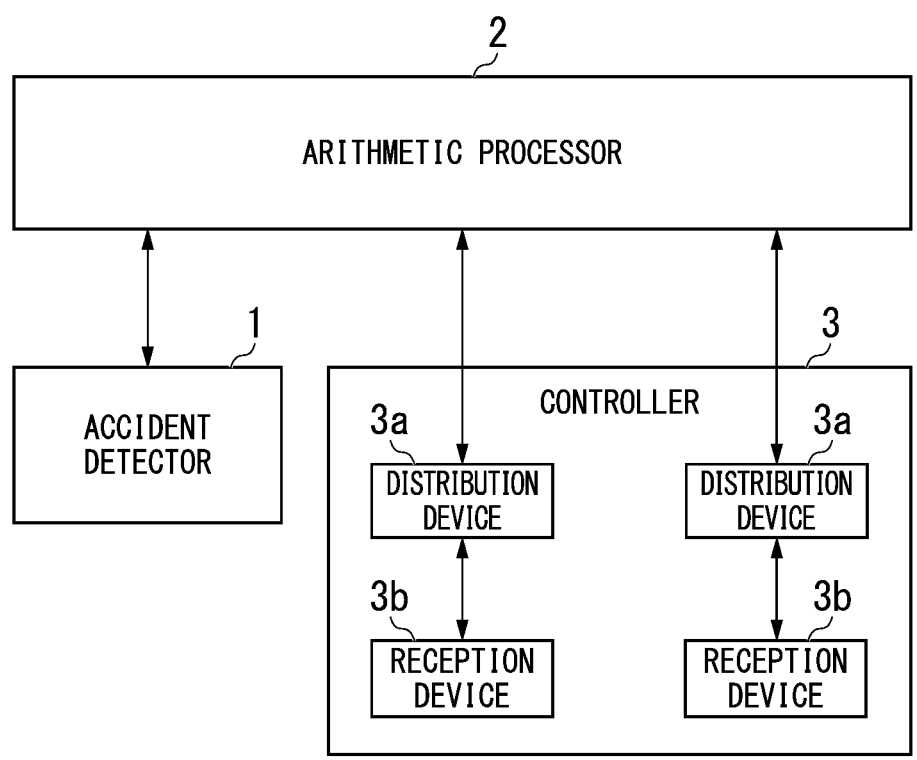
FIG. 17 is a diagram showing a configuration of a power system stabilizing system according to the related art.

FIG. 16 is a flowchart showing an example of a routine of processes of power restriction and reconnection which is performed by the power system stabilizing system SSC7. Steps S701 to S704 in the flowchart shown in FIG. 16 are the same processes as Steps S101 to S104 in the flowchart shown in FIG. 4, and thus description thereof will be omitted.

When the system restoration checker 530 checks that the power system has been restored from the system accident and a power restriction release command is received from the system restoration checker 530, the reconnection controller 610G selects all the power restriction targets which are cut off as reconnection targets and outputs a reconnection command to the reconnection targets (Step S705). After the reconnection command for the reconnection targets has been output, the reconnection checker 900 performs a reconnection checking process of determining whether the reconnection has succeeded for each reconnection target (Step S706). Regarding a reconnection target of which the reconnection has succeeded out of the plurality of reconnection targets, the failure frequency S thereof is initialized (Step S707), and the reconnection process is completed. Regarding a reconnection target of which the reconnection has failed out of the plurality of reconnection targets, the failure frequency checker 910 counts the failure frequency S of the reconnection target (Step S708). Then, the failure frequency checker 910 determines whether the failure frequency S is greater than the upper limit Sth (Step S709), and the reconnection controller 610G outputs a reconnection command for the power restriction target of which the reconnection has failed when the failure frequency S is not greater than the upper limit Sth (Step S710). When the process of Step S710 is performed, the reconnection checker 900 performs the reconnection checking process on the reconnection target of which the reconnection has failed again in Step S706. When there is a reconnection target of which the failure frequency S is greater than the upper limit Sth in Step S709, the warning output 920 transmits, for example, warning information including information of the reconnection target to an external communication terminal (Step S711). Initialization of the failure frequency S may be performed by the failure frequency checker 910 with output of the warning information from the warning output 920 as a trigger.

With the power system stabilizing system SSC7 according to the seventh embodiment, it is possible to achieve the same advantages as in the power system stabilizing system SSC1 according to the first embodiment. In addition, it is possible to rapidly notify an operator, a manager, or the like of the power system stabilizing system SSC7 that the reconnection has failed by outputting a warning when the reconnection has failed and to prompt the operator, the manager, or the like to cope with the failure in reconnection.

The reconnection checker 900, the failure frequency checker 910, and the warning output 920 according to the seventh embodiment can be applied to the second to sixth embodiments. For example, the processes of Steps S709 to S714 may be performed after the regenerative power supplies 50-$k$ have been reconnected in the second to sixth embodiments.

According to at least one of the aforementioned embodiments, since the system restoration checker 530 or the system restoration checker 530D configured to check that the power system has been restored from a system accident on the basis of system information of the power system after a regenerative power supply 50-$k$ which is a power restriction target has been cut off due to occurrence of the system accident is provided, it is possible to shorten the stop time of the regenerative power supply 50.

The power system stabilizing systems according to the aforementioned embodiments may be power system stabilizing systems using only regenerative power supplies as targets or may be power system stabilizing systems using both of regenerative power supplies and power supplies (power generators) other than regenerative power supplies.

The term "~unit" described in this specification refers to a unit for processing at least one function or operation, and this may be implemented by hardware or software or may be implemented by a combination of hardware and software.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power system stabilizing system comprising:
an accident detector configured to detect a system accident of a power system;
a power restriction target selector configured to select power restriction targets which are required for stability maintenance of the power system out of a plurality of power supplies included in the power system or connected to the power system according to a type of the system accident detected by the accident detector;
a cutoff controller configured to cut off the power restriction targets selected by the power restriction target selector;
a system restoration checker configured to check that the power system has been restored from the system accident on the basis of system information of the power system;
a reconnection controller configured to reconnect some or all of the power restriction targets cut off by the cutoff controller when the system restoration checker checks that the power system has been restored from the system accident; and
a disconnected power supply detector configured to detect disconnected power supplies other than the power restriction targets out of the plurality of power supplies,
wherein the reconnection controller is configured to reconnect some or all of the power supplies detected by the disconnected power supply detector as the reconnection targets in addition to the power restriction targets cut off by the cutoff controller.

2. The power system stabilizing system according to claim 1, further comprising an additional disconnected power supply detector configured to detect power supplies other than the power restriction targets which are disconnected from the power system after the power restriction targets selected by the power restriction target selector have been reconnected,
wherein the reconnection controller is configured to reconnect some or all of the power supplies detected by the additional disconnected power supply detector as the reconnection targets after some or all of the power restriction targets have been reconnected as the reconnection targets to the power system.

3. The power system stabilizing system according to claim 1, further comprising:
a post-reconnection system state checker configured to check whether a system abnormality has occurred in the power system after the reconnection targets have been reconnected to the power system before the reconnection targets have been reconnected to the power system by the reconnection controller; and
a reconnection target reselector configured to reselect the reconnection targets,
wherein the reconnection controller is configured to reconnect the reconnection targets when the post-reconnection system state checker has checked that no system abnormality has occurred, and
wherein, when the post-reconnection system state checker checks that a system abnormality has occurred, the reconnection target reselector is configured to reselect the reconnection targets until the post-reconnection system state checker checks that no system abnormality is occurring.

4. The power system stabilizing system according to claim 1, further comprising:
a reconnection checker configured to check whether reconnection of the reconnection targets has failed;
a failure frequency checker configured to count a frequency of failure of the reconnection checked by the reconnection checker; and
a warning output configured to output a warning to the outside when the frequency counted by the failure frequency checker exceeds an upper limit value.

5. A power system stabilizing system comprising:
an accident detector configured to detect a system accident of a power system;
a power restriction target selector configured to select power restriction targets which are required for stability maintenance of the power system out of a plurality of power supplies included in the power system or connected to the power system according to a type of the system accident detected by the accident detector;
a cutoff controller configured to cut off the power restriction targets selected by the power restriction target selector;
a system restoration checker configured to check in which of a partial restoration state in which only a partial system is restored from the system accident which is a permanent accident and a complete restoration state in which the power system is restored to a system state before the system accident occurred from the system accident which is a transient accident the power system restored from the system accident is on the basis of system information of the power system;
a reconnectable power calculator configured to calculate reconnectable power which is an amount of electric power to be supplied to the power system when the system restoration checker determines that the power system is in the partial restoration state;
a reconnectable target selector configured to select reconnectable targets such that the reconnectable power calculated by the reconnectable power calculating is satisfied; and
a reconnection controller configured to reconnect some or all of the power restriction targets cut off by the cutoff controller to the power system when the system restoration checker determines that the power system is in the complete restoration state and to reconnect the reconnection targets selected by the reconnectable target selector when the system restoration checker determines that the power system is in the partial restoration state.

6. The power system stabilizing system according to claim 5, further comprising:
a post-reconnection system state checker configured to check whether a system abnormality has occurred in the power system after the reconnection targets have been reconnected to the power system before the reconnection targets have been reconnected to the power system by the reconnection controller; and
a reconnection target reselector configured to reselect the reconnection targets, wherein the reconnection controller is configured to reconnect the reconnection targets when the post-reconnection system state checker has checked that no system abnormality has occurred, and wherein, when the post-reconnection system state checker checks that a system abnormality has occurred, the reconnection target reselector is configured to reselect the reconnection targets until the post-reconnection system state checker checks that no system abnormality is occurring.

7. The power system stabilizing system according to claim 5, further comprising:

a reconnection checker configured to check whether reconnection of the reconnection targets has failed;

a failure frequency checker configured to count a frequency of failure of the reconnection checked by the reconnection checker; and a warning output configured to output a warning to the outside when the frequency counted by the failure frequency checker exceeds an upper limit value.

8. A power system stabilizing system comprising:

an accident detector configured to detect a system accident of a power system;

a power restriction target selector configured to select power restriction targets which are required for stability maintenance of the power system out of a plurality of power supplies included in the power system or connected to the power system according to a type of the system accident detected by the accident detector;

a cutoff controller configured to cut off the power restriction targets selected by the power restriction target selector;

a system restoration checker configured to check that the power system has been restored from the system accident on the basis of system information of the power system;

a power demand-supply balance checker configured to check whether an abnormality in a power demand-supply balance of the power system has occurred when the system restoration checker checks that the power system has been restored from the system accident;

a necessary reconnection power calculator configured to calculate necessary reconnection power which is an amount of electric power required for releasing the power demand-supply balance when the power demand-supply balance checker checks that an abnormality in the power demand-supply balance has occurred;

a reconnection control target selector configured to select reconnection targets required for releasing the power demand-supply balance on the basis of the necessary reconnection power calculated by the necessary reconnection power calculator; and a reconnection controller configured to reconnect the reconnection targets selected by the reconnection control target selector.

9. The power system stabilizing system according to claim 8, further comprising:

a post-reconnection system state checker configured to check whether a system abnormality has occurred in the power system after the reconnection targets have been reconnected to the power system before the reconnection targets have been reconnected to the power system by the reconnection controller; and a reconnection target reselector configured to reselect the reconnection targets, wherein the reconnection controller is configured to reconnect the reconnection targets when the post-reconnection system state checker has checked that no system abnormality has occurred, and wherein, when the post-reconnection system state checker checks that a system abnormality has occurred, the reconnection target reselector is configured to reselect the reconnection targets until the post-reconnection system state checker checks that no system abnormality is occurring.

10. The power system stabilizing system according to claim 8, further comprising:

a reconnection checker configured to check whether reconnection of the reconnection targets has failed;

a failure frequency checker configured to count a frequency of failure of the reconnection checked by the reconnection checker; and a warning output configured to output a warning to the outside when the frequency counted by the failure frequency checker exceeds an upper limit value.

* * * * *